(12) United States Patent
Dokken

(10) Patent No.: US 8,180,507 B2
(45) Date of Patent: May 15, 2012

(54) MANOEUVRE AND SAFETY SYSTEM FOR A VEHICLE OR AN INSTALLATION

(75) Inventor: Sverre Thune Dokken, Monte-Carlo (MC)

(73) Assignee: Marine & Remote Sensing Solutions Ltd., Hampshire (GB)

( * ) Notice: Subject to any disclaimer, the term of this patent is extended or adjusted under 35 U.S.C. 154(b) by 561 days.

(21) Appl. No.: 12/441,061

(22) PCT Filed: Sep. 13, 2007

(86) PCT No.: PCT/EP2007/059674
§ 371 (c)(1),
(2), (4) Date: Mar. 12, 2009

(87) PCT Pub. No.: WO2008/031880
PCT Pub. Date: Mar. 20, 2008

(65) Prior Publication Data
US 2009/0271054 A1    Oct. 29, 2009

(30) Foreign Application Priority Data
Sep. 13, 2006 (GB) .................................. 0618047.5

(51) Int. Cl.
*B60L 3/00* (2006.01)
*B60L 15/00* (2006.01)
(52) U.S. Cl. ......... 701/21; 701/469; 701/300; 440/12.5; 340/903
(58) Field of Classification Search ............... 701/21, 701/213, 214, 215, 220, 300, 468, 469, 470; 440/1, 12.5; 340/850, 903
See application file for complete search history.

(56) References Cited

U.S. PATENT DOCUMENTS
4,428,052 A    1/1984 Robinson et al.
(Continued)

FOREIGN PATENT DOCUMENTS
DE    10028927 A1    12/2001
(Continued)

OTHER PUBLICATIONS
EPO Communication of Application No. 07803480.8-2215, dated May 20, 2011.
(Continued)

*Primary Examiner* — Gertrude Arthur Jeanglaude
(74) *Attorney, Agent, or Firm* — Banner & Witcoff, Ltd.

(57) ABSTRACT

A system for a vehicle is provided for allowing a user of the vehicle or installation to obtain advanced and up-to-date information about the surroundings of the vehicle or installation and the vehicle or installation itself. The system may be located on a marine vessel and it integrates information from a number of different information sources, located both on and off the vessel, en including information from advanced radar and sonar subsystems on the ship, information from conventional instruments and sensors and information from onshore and offshore installations and EO satellites accessed via a control center onshore. The system may communicate with the control center via a communication satellite and/or wireless Internet, if available. A data processing apparatus for processing and presenting the data is also provided. The data is received, processed and presented in three dimensions in space and updated in real time or near real time such that time provides a fourth dimension to the data. A graphical user interface for presenting the data is also provided. The graphical user interface provides functionality for reporting an error in the system if the end user's own observations do not match the presented data. Additionally, a system for collecting data comprising more than one ship, the control center and means for the ships and the control center to communicate is provided. The system comprises a catalogue and storage network for storing collected data. All data is stored with an associated quality measure of the data.

19 Claims, 13 Drawing Sheets

U.S. PATENT DOCUMENTS

| | | | |
|---|---|---|---|
| 6,812,888 B2 * | 11/2004 | Drury et al. | 342/357.31 |
| 7,209,221 B2 * | 4/2007 | Breed et al. | 356/5.02 |
| 7,359,782 B2 * | 4/2008 | Breed | 701/45 |
| 7,487,019 B2 * | 2/2009 | Estes et al. | 701/33 |
| 2003/0028293 A1 | 2/2003 | Jankowiak et al. | |
| 2003/0028294 A1 | 2/2003 | Yanagi | |

FOREIGN PATENT DOCUMENTS

| | | |
|---|---|---|
| GB | 2344713 A | 6/2000 |
| GB | 2379816 A | 3/2003 |
| JP | 60008185 A | 1/1985 |
| JP | 07270527 A | 10/1995 |
| WO | 03029837 A | 4/2003 |
| WO | 2005036199 A | 4/2005 |

OTHER PUBLICATIONS

EPO Communication of Application No. 07803480.8-2215, dated Jun. 1, 2011.

International Search Report, EPO, Apr. 2008.

International Search Report, GB, Nov. 2006.

* cited by examiner

MANOEUVRE AND SAFETY SYSTEM FOR A VEHICLE OR AN INSTALLATION

TECHNICAL FIELD

The invention relates to system for a vehicle or an installation. More particularly, but not exclusively, it relates to maneuvering, safety and security apparatus for a marine vessel, oil/gas production platform or harbour, which integrates information from a number of different information sources, both on and off the vehicle or installation, and presents the information to the end-user using a graphical user interface. The invention also relates to a system for communicating and storing the information.

BACKGROUND OF THE INVENTION

Instruments of different technological complexities can be used to navigate at sea. The most basic navigational tools include nautical charts in paper form, compasses and basic speed meters on the ship, while the more complex tools include chart plotters linked to GPS receivers and interfaces for connecting to Satcoms and/or for connecting to the Internet to obtain up-to-date metrological data.

Usually, a separate user interface is provided for each navigation device. For example, on the ship, there may be provided one display showing the depth from the hull to the seabed, another display showing the speed of the vessel relative to the ocean current and a third display interfacing to a conventional radar unit. Some attempts have been made to integrate the different devices. For example, the National Marine Electronics Association (NMEA) has developed an interface, which can communicate with a number of different conventional sensors. However, even if the data is presented together, it is typically only combined on a display and the data from the different sensors is typically not processed together.

Moreover, the user-friendliness of conventional interfaces and the detail of the information provided to the end-user are often not satisfactory. For example, a traditional user interface to radar sensors commonly displays a large cluster point on a screen to represent a large backscattered return from a large object in the vicinity of the ship and a small cluster point on a screen to represent a smaller backscattered return from a smaller object. Moreover, the point only conveys the object's distance relative to the radar sensor. As the radar turns 360 degrees, a full representation of all visible objects can be mapped on the screen. However, there is no possibility of investigating the object further such as investigating whether the object is a buoy or a swimmer. Moreover, the screen does not typically give the end-user a quick overview of the heading and speed of the object in relation to the ship.

Similarly, sonar technology is often used merely to show the depth in one dimension, i.e. the distance to the seabed directly below a single transducer on the ship. Consequently, it does not signal forward hazards such as rocks to the user. Forward-looking sonar heads have now been developed but they do not provide depth data coherently with range and bearing information.

Video and infrared cameras have been used for security purposes to protect against potential intruders approaching a ship. However, various objects can approach the ship without being detected by these systems, particularly in fog, during the night or when the objects approach below the surface of the water.

Traditional sensors and instrumentation on marine vessels do not adequately protect goods and people. They are not capable of detecting, tracking and providing details about events such as goods and people falling overboard.

The invention aims to address these and other issues.

SUMMARY OF THE INVENTION

According to the invention, there is provided a system for a vehicle or installation comprising a first subsystem for obtaining information about sub-surface objects in a first region around said vehicle or installation; a second subsystem for obtaining information about above-surface objects in a second region around said vehicle or installation; means for receiving information via a communication link from an information source external to said vehicle or installation; means for combining and processing information received from the first subsystem, the second subsystem and the means for receiving information; and means for presenting the combined and processed information to a user of said vehicle or installation.

The system may further comprise a third subsystem for obtaining information about surface layer objects in a third region around said vehicle or installation and the means for combining and processing information are configured to combine and process information received from the first, second and third subsystems.

The system may further comprise means for transmitting information from said subsystems to said information source via said communication link. The vehicle or installation may be a marine vessel and the information source external to said vehicle may comprise an onshore control centre. Alternatively or additionally, the information source external to said vehicle may also comprise sensors and instruments located on another marine vessel. The communication link may be a satellite communication link or a wireless Internet link. The information may be received from the sensors and instruments located on another marine vessel via the control centre.

The vehicle or installation may also be an oil/gas production platform or a harbour installation.

The means for combining and processing may be configured to generate a scene in three dimensions (3D) in space including information from said regions. The means for combining and processing may further be configured to update the 3D scene with time. The first and the second subsystems may be configured to obtain data sets in three dimensions in space. The means for presenting may be configured to present the information in three dimensions in space.

Consequently, the system according to the invention provides a system for obtaining, processing and presenting 3D data sets. It also allows the data to be updated with time, and time therefore provides a fourth dimension.

The first subsystem may comprise at least one sonar sensor and the second subsystem may comprise at least one radar sensor.

The third subsystem may comprise a payload including a lidar (light detecting and ranging) sensor, or a combination of a lidar and a thermal sensor and/or a laser sensor and/or an infrared sensor.

The information received via the communication link may comprise marine meteorological and oceanographic data including sea state and sea ice state information. The information obtained in the first and the second subsystems may comprise at least one out of positional information, shape information, size information and behavioural information of objects in the first and second regions. Behavioural information may include information about the speed, the heading and the change in the speed and the heading of an object.

The system may further comprise a fourth subsystem for obtaining additional information about the vehicle and its surroundings. The additional information could for example be information transferred over a National Marine Electronics Association (NMEA) interface from, for example, a GPS device.

According to the invention, there is also provided a data processing apparatus comprising: means for receiving information from a radar subsystem, a sonar subsystem and an onshore control centre; means for processing said received information; means for combining the processed information; means for interpreting said combined information; and means for presenting the processed, combined and interpreted information to a user.

The means for receiving may be configured to receive data sets in 3D in space, the means for processing, combining and interpreting may be configured to process, combine and interpret data sets in 3D in space and the means for presenting the information may be configured to present the information in 3D in space. The means for receiving, the means for processing, the means for combining, the means for interpreting and the means for presenting may further be configured to receive, process, combine, interpret and present real-time data sets or near real-time data sets.

The information received from said radar and sonar subsystems comprises information about at least one out of static and moving objects in the vicinity of a vehicle or installation. The information may further comprise information about hazardous marine meteorological and oceanographic (metocean) conditions in the vicinity of the vehicle. The data processing apparatus may further comprise means for transmitting a request for data to said control centre. The request may include a plan of the intended route of the vehicle or installation. The data processing apparatus may further comprise means for transmitting observed metocean data to said control centre.

The data processing apparatus may further comprise means for calculating and optimising the lowest fuel consumption during said route based on real-time or near real-time data sets.

The data processing apparatus may further comprise means for recording an error when the presented information is incorrect.

Furthermore, according to the invention, there is also provided a method comprising receiving information from a radar subsystem; receiving information sonar subsystem; receiving information from an onshore control centre; processing the received information; combining the information; interpreting the information and presenting the information to a user. Additionally, there is provided a computer program for performing the method.

Yet further, there is provided a device operable to receive information from a plurality of information sources and configured to provide a graphical user interface (GUI) for viewing information about the surroundings of a vehicle from the plurality of information sources, the graphical user interface comprising: a major view allowing a user to see a view of a 3D scene of the vehicle and its environment; a minor view showing a slice of said 3D scene.

The 3D scene may comprise a plurality of sections and each section comprises data from a different information source of the plurality of data sources and the GUI may be configured to update the data in each section independently of the other sections. The view of said 3D scene can be adjusted responsive to user input in order to show the 3D scene from any direction. The minor view can be rotated around a central axis of the vehicle.

The major and minor views may be configured to show representations of objects in the vicinity of the vehicle. The representations may be symbols representing the objects or true images of the objects. The device may comprises means for deciding whether to show a symbol or a true image of said objects and the means for deciding may be responsive to user instructions or predetermined settings. The true images may be bitmaps.

The device may further comprise means for defining an alarm zone, the alarm zone covering a predetermined region of said 3D scene; and means for analysing the information from the information sources to detect any objects located in the alarm zone.

According to the invention, there is also provided a computer program for a data processing device operable to receive information from a plurality of information sources, the computer program comprising computer executable instructions that when executed by the data processing device cause the data processing device to provide a graphical user interface for viewing information about the surroundings of a vehicle from the plurality of information sources, the graphical user interface comprising: a major view allowing a user to see a view of a 3D scene of the vehicle and its environment; a minor view showing a lateral forward and backward view of the vehicle and its environment.

Yet further, there is provided, according to the invention, a system for collecting data comprising: a first marine vehicle or installation comprising a first data processing apparatus and a first plurality of sensors for collecting data in a first region around said first marine vehicle or installation; a second marine vehicle or installation comprising a second data processing apparatus; a control centre being operable to communicate with the first and the second marine vehicles or installations via a bidirectional communication link; the first data processing apparatus being operable to transmit data collected from said first region to said control centre for storage; and the control centre comprising means for transmitting data collected from said first region to said second marine vehicle or installation.

Consequently, a system is provided wherein a plurality of vessels or installations can share information with each other.

The second marine vehicle or installation may be a marine vessel and the second data processing device may be operable to transmit a message to said control centre indicating the location of said second marine vessel at a specific time and the means for transmitting data in said control centre may be configured to transmit the data from said first region to said second marine vessel if said location is in the first region.

The bidirectional communication link may be a satellite communication link or a wireless Internet link.

The control centre may further be configured to receive information from onshore and offshore instruments, meteorological centres, authorities and organisations and earth observation satellites in addition to numerical model outputs.

The information transmitted to the second marine vessel from the control centre may comprise object maps and/or real images. It may further comprise sea state data and/or sea ice state data, and/or navigation, safety and/or security related information.

BRIEF DESCRIPTION OF THE DRAWINGS

Embodiments of the invention will now be described, by way of example, with reference to the accompanying drawings, in which.

DETAILED DESCRIPTION

System Structure

Figure 1:
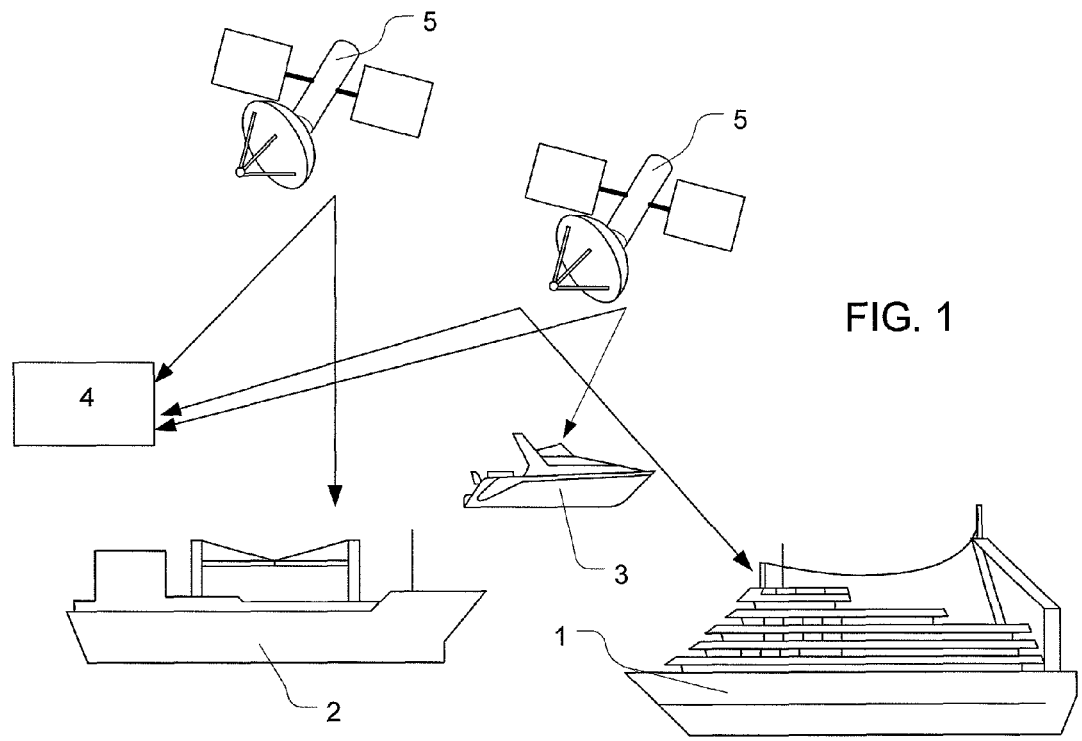
FIG. 1 shows a system comprising a plurality of marine vessels and a control centre.
Figure 2:
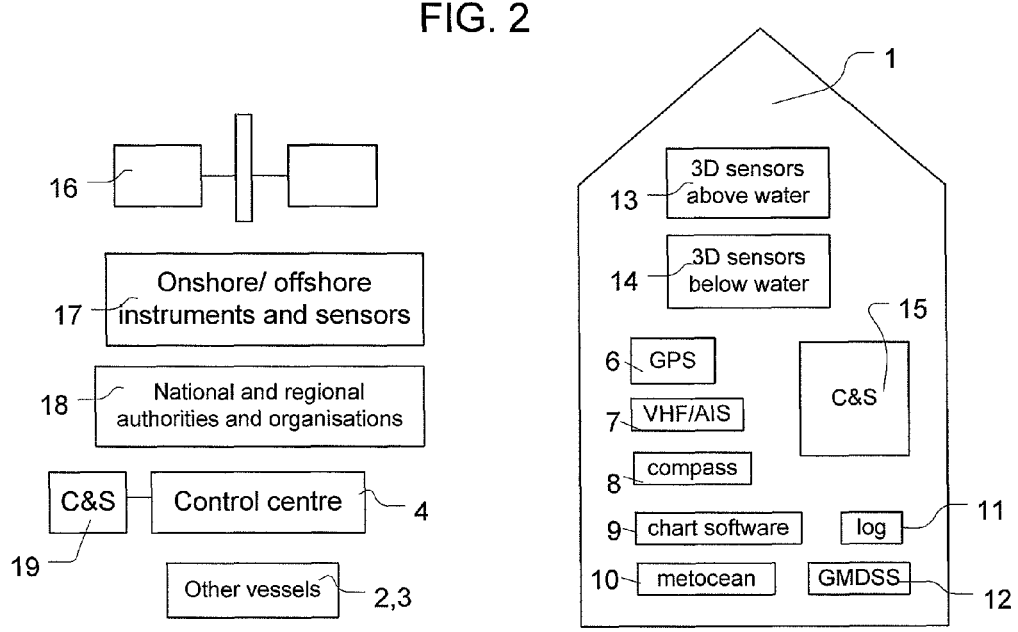
FIG. 2 is a schematic illustration of the information sources on and off a ship.

FIGS. 1 and 2 illustrate a system, which provide a security, safety, navigation, and anti-collision tool for marine vessels. The system includes at least one marine vessel 1, 2 and 3, such as a cruise ship 1, an oil/gas tanker/floating production unit 2, or a pleasure boat 3. It could also include a control centre 4 in communication with the at least one of the marine vessels via a communication link. The communication link may be provided as a satellite link via one or more communication satellites 5. The link may also be a wireless link to the Internet. The control centre 4 receives marine meteorological and oceanographic (metocean) data and ship information from a number of external information sources. Metocean data includes sea state data, such as wind, current and wave data, and sea ice state data, such as ice concentration, ice drift, ice edge and iceberg data. The vessels receive information from a number of sources, including the control centre 4, that allow them to manoeuvre safely. The information may include the distance between the hull of the vessels and the seabed, the coordinates of the vessels, details of other objects within a predetermined range of the vessels both above and below the surface of the water and metocean data.

One or more processing units located on the vessels combine the data from the information sources and display it in a comprehensible way to the end-users so as to provide a tool in particular for ship security, ship safety, anti-collision and navigation. The information sources are located both on and off the vessels and the information obtained from onboard information sources can be communicated to other vessels via the communication satellites 5 or the Internet and the control centre 4 onshore.

The onboard information sources will be described with respect to the cruise ship 1. However, the other vessels 2, 3, operate similar systems. Moreover, it should be recognised that the applications of the system are not limited to a cruise ship 1, an oil tanker 2 or a pleasure boat 3. The system can be used on any type of suitable vessel, offshore installation or installation in a harbour or port.

Conventional ship borne information sources on the ship 1 include a Global Positioning System (GPS) receiver 6, a very high frequency (VHF) receiver 7, which together with the GPS receiver provides an Automatic Identification System (AIS) that allows the position of the ship to be communicated to other marine vessels 2, 3 nearby. The ship typically also has a compass 8 and chart software 9, such as a Chartplotter or an Electronic Chart Display and Information System (ECDIS) for storing and presenting navigational information in electronic form. Furthermore, the ship has conventional metocean sensors 10 to gather wind, speed and current data. Additionally, it has a log 11 located in the bow and/or stern for measuring the water current under the ship in directions parallel and/or transverse to the bearing of the ship in order to assess ship drift. It typically also comprises a Global Maritime Distress Safety System (GMDSS) 12 including an Emergency Position-Indicating Radio Beacon (EPIRB).

The information sources onboard the ship 1 also include one or more subsystems of sensors for providing continuous all-around coverage, i.e. a 360-degree surround view, of surface and subsurface objects and the terrain. Terrain data may include bathymetry data and observations of rocks, the coastline, reeves and atolls. Surface and sub-surface objects may include vessels, small boats, scuba divers, floating containers, buoys, or a man over board. Each subsystem collects data in three dimensions in space. The data from the different subsystems can then be combined to provide a complete 3D scene of the surroundings of the ship 1. One subsystem 13 is designed to collect data above the surface of the water and another subsystem 14 is designed to collect data below the surface of the water. Alternatively or additionally, the system may also consist of a sub-system that is designed to collect data in the surface layer of the water, which will be described in more detail with respect to FIG. 22. Hereinafter, the subsystem 13 for data above the water will be described as comprising a plurality of radars and the subsystem 14 for data below the water will be described as comprising a plurality of sonar sensors. The alternative additional subsystem for data in the surface layer will be described as comprising a lidar or a combination of a lidar and a laser and/or thermal sensor, and/or infrared sensor. However, it should be understood that any suitable sensors could be used, e.g. infrared cameras, optical sensors, microwave sensors, multi/hyper-spectral sensors and others.

The radar and sonar subsystems, according to the invention, collect data in three dimensions (3D) in space. Moreover, the data is also updated with time and therefore, time provides a fourth dimension to the data sets. Hereinafter, a reference to 3D should be construed to mean three dimensions in space.

Conventional radar and sonar sensors on ships only record data in one or two dimensions in space and how the data changes with time. There are various techniques for recording data in three dimensions, for example, simultaneously recording two images of the same scene from different angles or recording two images of the same scene at different times and then interpreting the data from the two images together. These techniques have been successfully used to obtain 3D data sets from radar sensors on earth observation satellites. The radar and sonar sensors for recording data in 3D in the radar and sonar subsystems according to the invention will not be described in detail herein. It should be recognised that radar and sonar sensors using any suitable technology for collecting data in 3D may be used. Hereinafter, the terms "radar sensor" and "sonar sensor" will be used to refer to a radar sensor or sonar sensor configured to provide data sets in 3D, unless otherwise specified.

The capability of the radar and sonar sensors to observe objects in the surface layer of the ocean may be limited. The surface layer is the first few meters of ocean depth. A lidar sensor, or a combination of lidar, an infrared sensor or a thermal sensor can additionally or alternatively be used to penetrate the surface layer in order to detect any objects therein. It should be recognized that any lidar sensors using suitable technologies for collecting data in the surface layer may be used. Hereinafter, the terms "surface sensor" will be used to refer to a lidar technology sensor configured to provide surface layer data sets, unless otherwise specified.

The ship borne information sources further include a storage and catalogue unit 15 in which raw data and processed data from all the sensors can be stored for future retrieval. The storage and catalogue unit 15 also stores error reports as part of an error-reporting scheme provided in the system according to the invention.

The information sources external to the ship 1 include a number of earth observation (EO) satellites 16, including weather satellites and GPS satellites. The information sources also include onshore and offshore instruments and sensors 17 such as coastal radar installations and buoy installations. National and regional authorities and organisations 18 process the data obtained from the EO satellites 16 and the onshore and offshore instruments 17 and may use numerical models to produce forecasts, so as to add value to the data. Examples of national and regional authorities and organisations are space agencies, meteorological offices, search and rescue centres and forecasts centres for analysing data from the space agencies and the meteorological offices.

The control centre 4 may process the information from the national and regional authorities 18, onshore and offshore instruments and sensors and EO satellites further and may use the received data in additional numerical models especially relevant for the subscribers of data from the control centre 4.

The control centre 4 may also store and process information from the marine vessels 1, 2, and 3. The information from the marine vessels 2 and 3 is obtained from a similar arrangement of onboard information sources to those of the ship 1 described herein. Any data gathered at the ships, e.g. GPS, speed, heading and metocean data can be sent from the vessels 1, 2 and 3 to the control centre 4. The control centre 4 further maintains a catalogue and storage unit 19 equivalent to the catalogue and storage unit 15 onboard the ship 1, for storing historical data and error reports.

Figure 3:
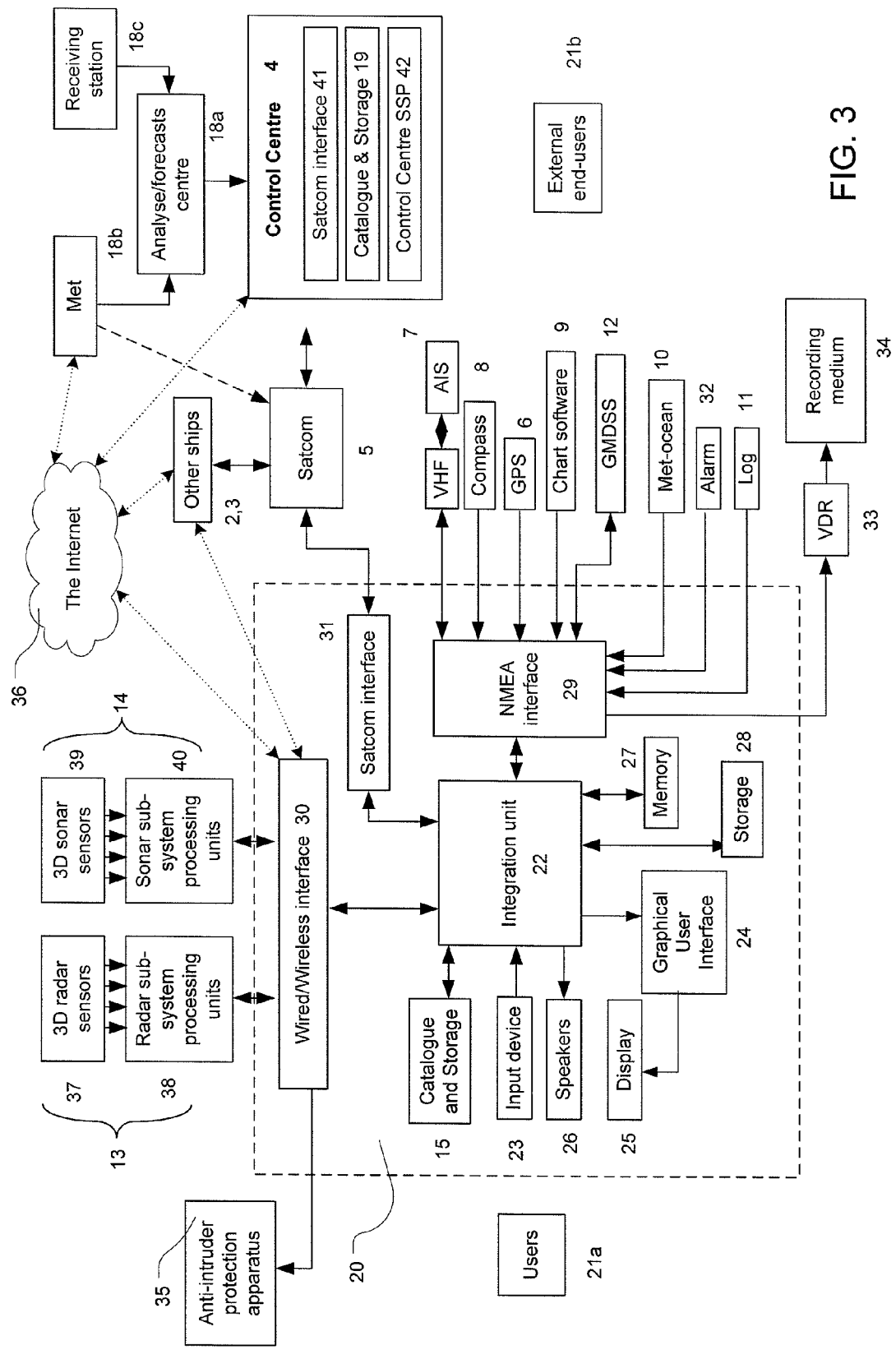
FIG. 3 is a schematic diagram showing how the information sources are connected to a main processing device on the ship.

Referring to FIG. 3, the connections between the different sensors, instruments and processing units on and off the ship 1 are illustrated in more detail. A main processing device 20 is provided on the ship 1 for collecting, integrating and graphically presenting data from a number of sources to the end user 21a. In practice, more than one such processing device 20 may be provided. For example, it is contemplated that at least one main processing device is located on the bridge of the vessel for use by the Captain of the ship. Another main processing device may be provided for use by the Navigation Officer and may be located either on the bridge or at another suitable location on the ship. A third main processing device may be provided for the Security Officer and may be located in his office if such an office exists on the ship. Also, a plurality of smaller processing devices that act as slaves to the main processing devices and show exactly the same information as their associated main processing device may be provided around the ship, both indoors and outdoors. A smaller number of main processing devices and slave devices may be used on a smaller vessel. For example, only one main processing device and no slave devices may be used onboard a small pleasure boat 3.

In addition to the users 21a on the ship, a number of external end users 21b receive information from the main processing device via the control centre 4. External end-users include, but are not limited to, the coast guard, the police, port masters, national and regional authorities and organisations, or an onshore management office of the ship 1.

The main processing device 20 includes an integration unit 22 for integrating and analysing the data received from all the sensors. The integration unit 22 is connected to the catalogue and storage unit 15. Although the catalogue and storage unit 15 is shown in FIG. 3 to be located in the main processing device 20 it should be understood by the skilled person that the actual data storage could be distributed throughout the ship 1.

The integration unit 22 is further connected to one or several user input devices 23, including but not limited to a mouse, a touch pad, a touch screen, a microphone, or a keyboard for receiving instructions from users 21a. It is further connected to one or several graphical user interfaces 24 and one or several displays 25 for displaying the data processed by the integration unit 22 in a comprehensible manner to the users 21a. The display 25 may be a 2D LCD display. It may also be a 3D display, such as an autostereoscopic display. Speakers 26, connected to the integration unit 22, are also provided for communicating complimentary information to that displayed on the display 25 to the end user. The integration unit 22 is further connected to a memory 27, such as a Random Access Memory, and storage 28, such as a hard disc, for storing application programs, including but not limited to the code and settings for the graphical user interface 24, user profiles for different ship personnel, nautical charts in electronic form and identification data about the ship. Additionally, the memory 27 is configured to store sensor and EO data in the memory 27 for a predetermined time after it has been received such that a user can retrieve recent data without having to access the catalogue and storage units 15, 19.

To communicate with externally located stand-alone instruments and the control centre 4, the main processing device 20 further comprises an NMEA interface 29, a wired/wireless network interface 30 and a Satcom interface 31.

The NMEA interface 29 typically links the main processing device 20 to the VHF and the AIS receiver 7, if such exists, the compass 8, the GPS receiver 6, the chart software 9, the conventional instruments onboard the ship 10 for collecting metocean data, the log 11 and the GMDSS 12. Using the NMEA interface 29, the main processing device 20 can also interface with a conventional ship-borne alarm system 32. The ship-borne alarm system 32 may include various types of bridge alarms like fire and engine control alarms.

The NMEA interface 29 further interfaces with a voyage data recorder (VDR) 33. A VDR is a data recording system for collecting data from various sensors onboard the ship. The VDR 33 digitises, compresses and stores the data in an externally mounted protective storage unit 34. Typically, the last hours of screen shots from the display 25 of the main processing device 20 may be stored on the recording medium in the protective storage unit 34. Also, selected radio communication on the ship may be stored. Some marine vessels are required to have a VDR 33 and an associated protective storage unit 34 according to international regulations. The protective storage unit 34 is designed to survive major marine incidents intact and to withstand extreme pressure, heat, shock and impact. The data can therefore be recovered after a major incident and analysed by the authorities to investigate the incident. The recording medium 34 can be combined with the GMDSS 12.

It should be noted that the data received by the VDR unit 33 may also be provided to the Satcom interface 31 and/or wireless interface 30 in real-time in order for external end-users 21*b* to receive such information in real-time via the control centre 4.

Additionally, the NMEA interface 29 can interface with existing conventional radar and sonar sensors (not shown). The instruments connected to the NMEA interface 29 are all well known in the art and will not be described in detail herein.

The wired/wireless network interface 30 links the main processing device 20 to the radar subsystem 13 and the sonar subsystem 14. The communication link to the subsystem can be either wired or wireless depending on the data rates required for the system and the location of the subsystem units 13, 14 on the ship 1 relative to the main processing device 20. Consequently, the wired/wireless network interface may be able to support both wireless and wired communication protocols. The communication links between the subsystems 13, 14 and the main processing device 20 are designed to carry various types of messages, including but not limited to, object messages, diagnostic messages, system status messages and user instructions.

Additionally, the wired/wireless interface 30 links the main processing device 20 to anti-intruder protection apparatus 35, which will be described in more detail with respect to FIG. 20.

The wired/wireless interface 30 also allows the ship 1 to connect to the Internet 36 wirelessly when the ship 1 is located where wireless Internet access is available.

The Satcom interface 31 links the main processing device 20 to the control centre 4 via the communication satellite (Satcom) 5. However, when the ship 1 is in a harbour where wireless Internet access is available, the control centre 4 can also be accessed over the Internet through the wired/wireless network interface 30. The Satcom 5 provides an encrypted link that supports TCP/IP communication. To transmit and receive information, the ship 1 must have a sufficiently fast uplink/downlink connection, typically faster than 64/256 kbps. The Satcom 5 provides a two-way communication link such that the ship 1 is able to not only receive information from the control centre 4 but also to transmit data from the main processing device 20 on the ship 1 to the control centre 4 to be stored in the catalogue and storage service 19 therein and/or to be forwarded on to other marine vessels 2, 3. The data may also be transmitted directly from the main processing device 20 of the ship 1 to the other marine vessels 2, 3. Additionally, data may also be sent over the Internet, directly or via the control centre 4, to external end users 21*b* (such as coast guard, police, harbour masters, vessel management office, etc.).

The wired/wireless network interface 30 and the Satcom interface 31 may also provide point-to-point links to other ships.

The radar and sonar subsystems 13, 14 and the control centre 4 are stand-alone systems that may use different communication protocols. Moreover, the information from the control centre 4 and subsystems 13, 14 may be encrypted and compressed. The wired/wireless interface 30 or the Satcom interface 31 may decrypt and decompress the information from the control centre 4 and transfer the data to the integration unit 22. The wired/wireless interface 30 and the Satcom interface 31 may not necessarily convert any data themselves but they recognise where certain information can be found in the data flow such as the position of objects in 3D coordinates, object types, object shapes, etc. The interfaces pass on the information in a format that can be understood by the integration unit 22.

The radar subsystem 13 comprises the radar sensors 37 and a number of radar processing units 38 that will be described in more detail with respect to FIGS. 4*a* and 4*b*. The sonar subsystem 14 comprises the sonar sensors 39 and the sonar processing units 40 that will be described in more detail with respect to FIGS. 5*a* and 5*b*.

The control centre 4 is electronically connected by, for example, a fast Internet connection to an analyse/forecast centre 18*a* that in turn is connected directly or indirectly to a met office 18*b* and/or a receiving station 18*c*, which may be connected to one or more EO satellites. The control centre can also communicate via satellite communication links to other marine vessels 2, 3, in a similar manner to how it communicates with the ship 1. A satellite communication interface 41 is provided in the Control Centre 4 for interfacing with the Satcom 5. The control centre 4 can furthermore connect to one or more selected external end-users 21*b* via the Internet 36. Such end-users may include the coast guard, the police, harbour masters, certification bodies, insurance companies, national and regional authorities and organisations, and various service offices for the operation of ships, a oil/gas production unit or ports/harbours.

The met office 18*b* may also provide weather data, for example, via the Internet 36 or via Telex and the main processing device 20 can access the weather data directly from the met office 18*b* through their services rather than going through the control centre 4. However, the information provided through the services of the met office 18*b* is typically not as up-to-date and as accurate as the information provided through the control centre 4. With the system shown in FIG. 3, the total time delay between an observation and the onboard data access is typically less than 1 hour for most data (i.e. EO observation satellite data, onshore instrument and sensor data, offshore instrument and sensor date, etc). This assumption is valid for high bit rate data whereas low bit rate data should be accessible within minutes.

Selected information is stored in the catalogue and storage unit 19 for future retrieval. Selected information may also be processed in the Control Centre Sub-System Processing Unit (CC SSP) 42 in order to derive higher level information. The selected information may be obtained from the marine vessels 1, 2 and 3 and the data sources 16, 17 and 18 external to the ship 1. An example of higher level information is real-time fuel optimised sail plan information. Other functionalities can be included in the CC SSP 42 as requested by either the users 21*a* or the external end-users 21*b*, particularly functions for deriving higher level information relevant for navigation, safety and security, or for validation of observations external to the system (e.g. validation of data from new EO satellite missions).

Requested information is sent via the Satcom 5 to the ship 1. The information is compressed and encrypted in the control centre 4 before being sent to the ship 1. The types of EO data available from the control centre 4 and the level of accuracy of such data in relation to traditional metocean data will be described in more detail below with respect to FIG. 6.

Radar Subsystem

Figure 4A:
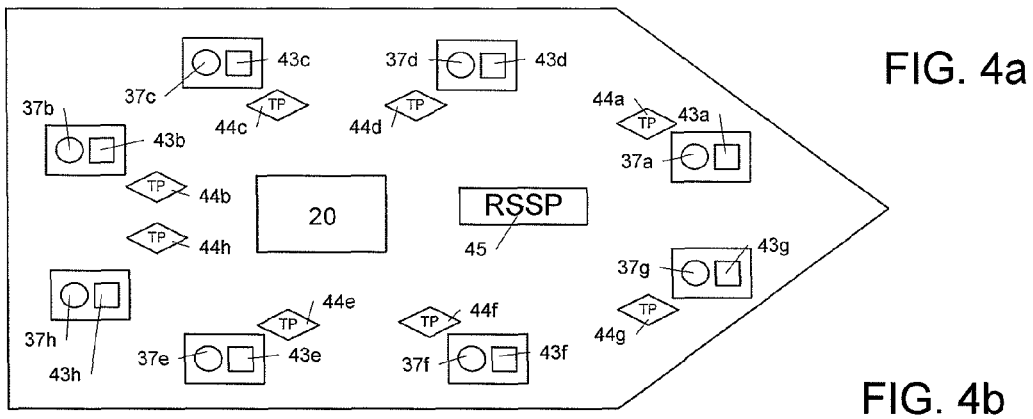
FIGS. 4a and 4b illustrate the location and the arrangement of the components of a radar subsystem on the ship.
Figure 4B:
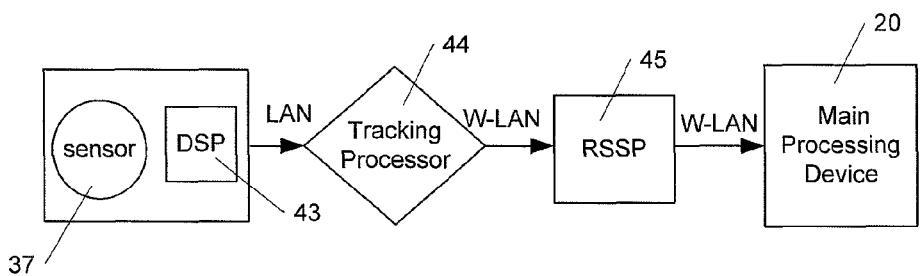

Referring to FIGS. 4*a* and 4*b*, a plurality of radar units provides a complete 3D scene of the surroundings of the ship, i.e. 360 degrees around the ship 1. Moreover, the radar subsystem processing units 38 comprise a number of different processing units for different stages of the processing of the raw data. Each radar sensor 37 is incorporated into a sensor unit, which comprises the sensor 37 and a digital signal processor (DSP) 43. The output of the sensor 37 is connected to the input of the DSP 43. The radar sensors 37 may be an imaging interferometric synthetic aperture radar (InSAR). However, any suitable radar sensor for providing 3D imagery can be used. The DSP pre-processes the signals from the sensor 37. The sensor unit is connected to a tracking processor 44, which in turn is connected wiredly or wirelessly to a radar subsystem processor (RSSP) 45. The RSSP is typically located close to the central data processing unit 20 and provides the processed data thereto. The DSPs 43, the tracking processors 44, and the RSSP 45 together make up the radar sub-system processing units 38.

The ship 1 typically has one short-range sensor 37a at the bow of the ship 1, one short-range sensor 37b at the stern and a number of short-range sensors 37c, 37d, 37e, 37f mounted on the port and starboard sides. The sensor units are spaced apart by distances selected in dependence on their horizontal field of view angle, so as to achieve a complete and uninterrupted field of view around the ship 1. Moreover, there are typically two far-range sensors 37g, 37h, mounted at the bow and the stern respectively, in order to extend the observation area forward and backward of the ship 1. However, it should be understood that any suitable combination of short-range and far-range sensor units could be provided.

The minimum range of the far-range sensors starts at the maximum range of the short-range sensors. Each radar sensor 37a-37h is provided in a radar unit which also includes a DSP 43a-43h. Moreover, for each radar unit, there is an associated tracking processor 44a-44h. A single RSSP 45 communicates with all the tracking processors 44a-44h.

All the radar sensors 37 are typically placed at similar vertical distances from the water and mounted with a free field of view. The short-range sensors are mounted so that the lower part of their vertical beam scatters just outside the hull at water level. Each radar has a vertical field of view of typically 10 degrees, i.e. ca 100 m vertical distance at 500-meter range from the ship and a horizontal field of view of at least 90 degrees. In some embodiments, the horizontal field of view is 180 degrees. The radars operate in the maritime frequency band. The signal polarisation is preferably horizontal when transmitting and horizontal when receiving (HH) in order to reduce wave scattering and enhance "out-of-water" detection, but other polarisation combinations can also be used particularly for low incidence angles. Since both a short-range and a far-range sensor are typically used in the stern and the bow, a total of a few kilometers are observed in front of and behind the ship 1.

The sensors measure the characteristics of the reflected radio signals that reach the sensors to determine the distance to the object that caused the reflection, and the nature and behaviour of the object (e.g. the shape, size, speed, bearing direction and a true image of the object). It should be recognised that the radar can, in addition to marine vessels, buoys, swimmers, flotsam, etc, also detect metocean data, including unusually high waves.

The pre-processing performed by the DSP is well known in the art and will not be described in detail herein. When the data is passed to the tracking processor 44, it is compared to other frames (and typically filtered using, for example, Kalman and Lee filtering) such that the object can be tracked. The tracking includes, for each frame, computing an estimation of the position of the object in the next frame and looking for the object in the estimated position in the next frame. The trajectories of the objects are estimated and reported to the RSSP 45. A tracking processor 44 should be able to track a large number of objects simultaneously. Preferably, the number of objects tracked simultaneously should be sufficiently large to allow all relevant objects for navigation, security and safety assessment to be tracked. When the data is received at the radar subsystem processor 45, the data from the different sensors is correlated. It is possible that two sensors may have registered the same objects and the RSSP 45 compares the objects found by one sensor with the objects found by another. The RSSP 45 also runs a simulation of a potential impact between the ship 1 and the object, i.e. it computes, for example, the closest point of approach (CPA) and the time to the closest point of approach (TCPA) for the object. All the data is stored and transmitted with metadata as further discussed with respect to FIG. 21. The meta data describes the associated raw and processed data sets and includes parameters such as the date of acquisition, the date of processing, the geographical location where the data was collected, the type of the data set, such as "far-range radar" or "short-range radar" for the data obtained from the radar sensors 37, the owner of the data set, etc, in order to be able to retrieve a particular data set later.

Although the communication link between the DSP 43 and the tracking processor 44 has been described with respect to FIGS. 4a and 4b as a Local Area Network (LAN) link and the communication link between the tracking processor 44 and the RSSP 45 has been described as a Wireless Local Area Network (W-LAN) link, it should be understood that FIGS. 4a and 4b are intended to be exemplary rather than limiting and the communication link could also be provided with, for example, a Universal Serial Bus (USB) or a Serial Peripheral Interface (SPI) link.

Moreover, the schematic boxes shown in FIGS. 4a and 4b shall be interpreted as representing the processes performed rather than separate physical devices. In some embodiments, it may for example be preferred that the tracking processors 44a-44h are located in the RSSP 45 or that a DSP 43 and a tracking processor 44 are combined into a single unit.

Sonar Subsystem

Figure 5A:
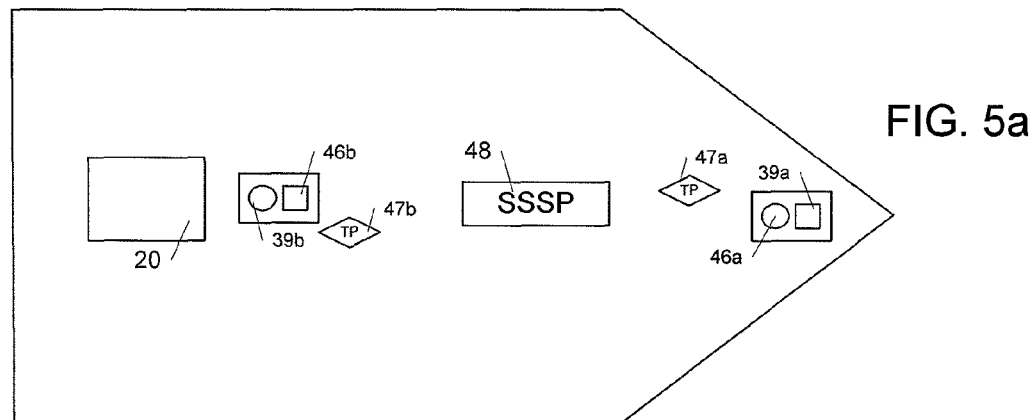
FIGS. 5a and 5b illustrate the location and the arrangement of the components of a sonar subsystem on the ship.
Figure 5B:
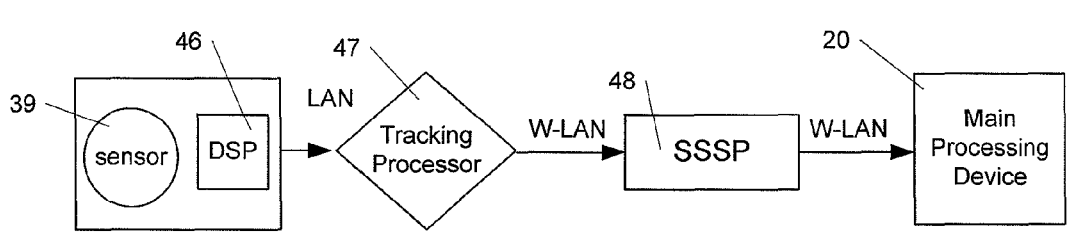

One or several sonar heads 39 are required to provide a complete 3D map of the 360° surroundings of the ship 1 below water. FIGS. 5a and 5b illustrate an embodiment wherein two sonar heads 39a, 39b are used. If only a single sonar head is used, the sonar head may be provided as a circular sonar head, submerged under the ship and mirroring four sonar heads on a single support. More than two sonar heads can also be used.

The sonar subsystem processing units 40 comprise a number of different processing units for different stages of the processing of the raw data from the sonar sensors 39. The subsystem processing units 40 will be described with respect to FIGS. 5a and 5b but it should be clear that it could be adapted to also operate with a single circular sonar head.

Each sonar head 39 includes transducers and receivers. Referring to FIGS. 5a and 5b, the sonar head 39 is provided in a sonar unit which also comprises a DSP 46. The sonar head 39 is connected via a wired link to a tracking processor 47 for tracking objects indicated in the data. The tracking processors 47 are wirelessly connected or wired to a sonar sub-system processor (SSSP) 48, which in turn is wirelessly connected or wired to the central data processing unit 20. The DSPs 46, the tracking processors 47 and the SSSP 48 together make up the sonar subsystem processing units 40.

In the case where there is a single circular sonar head, the sonar head is flush mounted under the ship 1. In the case of FIGS. 5a and 5b, there are two sonar heads 39a, 39b flush-mounted on the hull of the ship 1. One sonar head 39a is positioned in the bow and one sonar head 39b is located centrally underneath the ship 1. Each sonar head 39a, 39b has an associated DSP 46a, 46b and an associated tracking processor 47a, 47b. All the tracking processors connect to a single SSSP 48. FIG. 5a shows the ship 1 from above and the location of the sonar heads 39a, 39b, the DSPs 46a, 46b and the tracking processors 47a, 47b are schematically indicated. The sonar heads 39 are mounted as deep as possible on the hull. Of course, the location and number of sensors described with respect to FIGS. 5a and 5b is exemplary only and any number of suitable sensors can be used.

The sonar sensors 47 have a range of up to at least a few kilometres forward and a few hundred meters in the other directions. The sensor configuration has a 360 degrees field of view horizontally but is typically limited to an observation range of a few dozen meters vertically. The sonars typically operate in the frequency range of one to a few hundred kilohertz and the system is designed to operate in speeds of up to at least 25 knots.

The sonar head and the DSP essentially measure the characteristics of the reflected signals that reach the sensor to determine the distance to the object, which caused the reflection, and the nature and behaviour of the object (e.g. the size, speed, bearing direction and a true image of the object).

The pre-processing performed by the DSP is well known in the art and will not be described in detail herein. When the data is passed to the tracking processor, data in one frame is compared to other frames (and typically filtered using, for example, Kalman and Lee filtering) such that the object can be tracked. The tracking includes, for each frame, computing an estimated position of the object in the next frame and looking for the object in the estimated position in the next frame. The trajectories of the objects are estimated and reported to the SSSP 48. Preferably the number of objects simultaneously tracked should be sufficiently high to track all relevant observations for navigation, security and safety assessment. When the data is received at the SSSP, the data from the different sensors is correlated. It is possible that two sensors may have registered the same objects and the SSSP 48 compares the objects found by one sensor with the objects found by another. The SSSP also runs a simulation of an eventual impact between the ship and the object. For example, the simulation might provide an estimate of the CPA and the TCPA of the object in relation to the ship 1. All the data is stored and transmitted with metadata as further discussed with respect to FIG. 21. The meta data describes the associated raw or processed data sets and includes parameters such as the date of acquisition, the date of processing, the geographical location where the data was collected, the type of the data set, such as "sonar" for the data obtained from the sonar sensors, the owner of the data set, etc, in order to be able to retrieve a particular data set later.

Preferably, the resolution of the sonar subsystem is good enough to show the anchor of the ship. In one embodiment, an accelerator is mounted on the anchor for sending out signals that are picked up by the sonar head when the anchor moves.

The connections between the DSPs 46 and the tracking processor 47 are shown in FIG. 5b to be wired LAN connections and the connection between the tracking processors 47 and the SSSP 48 is shown to be a W-LAN connection. However, it should be understood that the connections might be any suitable connection, including USB and SPI connections.

Moreover, the schematic boxes in FIGS. 5a and 5b for the different processing units shall be interpreted as representing the processes performed rather than separate physical devices. In some embodiments, it may for example be preferred that the tracking processors are located in the SSSP or that the DSP and the tracking processor are combined into a single unit.

Control Centre

A large proportion of the data available from the control centre originates from EO satellite observations. However, the data may also be derived from onshore and offshore observations and from numerical models run either in the analysis and forecast centre 18a or in the control centre 4.

Figure 6:
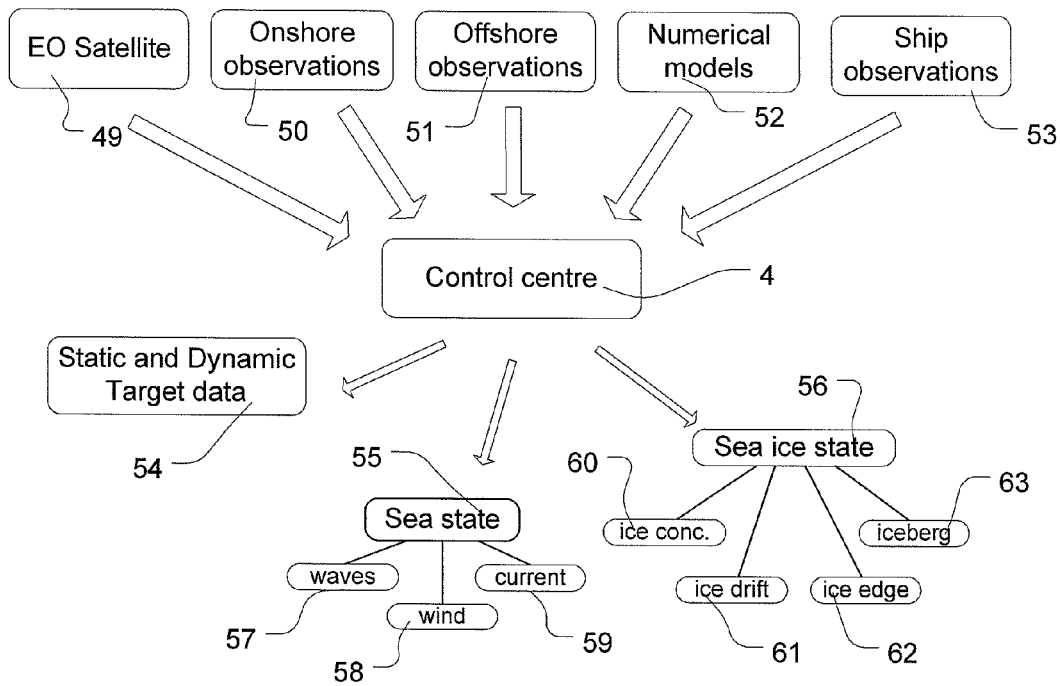
FIG. 6 schematically illustrates the type of earth observation (EO) data available for communication to the ship.

Referring to FIG. 6, the data processed by the control centre can therefore be categorised according to its origin. The categories include EO satellite data 49, onshore observations 50, offshore observations 51, numerical model data 52 and observations from ships 53. The EO satellite data 49, the onshore observations 50, the offshore observations 51 and the observations from other ships 53 can be used as input for data assimilation in numerical simulations and higher level data analysis in the CC SSP 42 of the control centre 4. The result of the numerical simulations is transmitted with metadata indicating that it derives from a numerical simulation rather than a real observation. The higher level data analysis may involve, for example, calculating the most fuel efficient sailing plan of a vessel sailing from one location to another. The calculation will be based on a hydrodynamic model of the vessel, continuously updated metocean data, and vessel position, speed and heading. The calculation will be continuously performed as the metocean conditions changes over the sail plan. Other high level data analysis may involve calculations relevant for providing enhanced navigation, safety and/or security information to users 21a and end-users 21b. Higher level data analysis, including calculations of the most fuel efficient sailing plan, can also be performed in the main processing device 20 on the ship.

The offshore observations are described herein as mainly originating from other ships. However, it is possible that the offshore observations may be derived from, for example, radar and other sensor installations moored to buoys and sensors installed on oil/gas production and/or storage platforms. The information from the ship 1, including metadata, is sent during sailing to the control centre 4. For example, when setting out, the sailing plan of a ship can be submitted to the control centre, and metocean and target data received from the ship along the route can be processed in the control centre with consideration to the sailing plan. The data can then be sent to other vessels sailing along the same route or intersecting the route of the ship 1.

EO satellite data, onshore observation data and some offshore observation data is likely to be received via national and regional authorities and organisations 18 as previously described with respect to FIG. 2.

All the information received or obtained in the control centre 4 is processed in the control centre 4 by the CC SSP 42 to correlate different types of data categorised according to its subject rather than its origin. The output data includes static and dynamic target data 54 and metocean data, including sea state data 55 and sea ice state data 56. The target data 54 includes information about objects such as vessels, buoys, oil platforms, etc on the sea. Before being sent to the ship, the target data may be masked to discard landscape data. Sea state data 55 include but is not limited to ocean wave data 57, ocean current data 58 and wind data 59. The maximum height of the waves in any specific location, the speed and direction of the waves, the speed and direction of the ocean currents and the speed and direction of the wind in that specific location is typically computed. Sea ice state data 56 include but is not limited to ice concentration 60, ice drift 61, ice edge 62 and iceberg data 63. However, more detailed data and other types of data, e.g. oil pollution, flotsam warnings, etc, can also be provided. The target data 54, the sea state data 55 and the sea ice state data 56 may derive from a combination of satellite observations, onshore observations, offshore observations and numerical model output data in order to enhance the overall quality of the data before sent to a vessel.

If a number of information sources available to the control centre 4 relates to the same observation, for example, if both the EO satellite data and the data received from ships include information about the same storm, the data received from the control centre may be synthesised from all the different data available. By synthesising the data from a number of different sources, the accuracy of the measurement can be often greatly improved.

In other words, the CC SSP 42 may perform a generic correlation and assessment of data obtained using different data collection methods and constituting observations of the same object or metocean conditions in order to improve overall quality and through put time. For example, an AIS object can be observed by radar, sonar, lidar, passive satellite, a coastal station and onboard VHF/AIS systems. Correlation and assessment of data obtained using different collections but relating to the same object may also be performed in the main processing device 20.

In Situ Observations

The control centre 4 provides all available observations for a time and location selected in dependence on a sailing plan of a ship having the system according to the invention. All available data is sent to the ship without any time delay as it sails along its route. This ensures that the ship receives the most recent and appropriate data available. In conventional systems, the exact location and time of observations relevant for a ship is not known by the providers of the data. Consequently, data for a large region and over a much longer time is gathered and sent in bulk to any ship. The data can be sent when it is needed and can be tailored to the exact location, time and circumstances of the ship in order to increase the overall benefit to the user of the provided data. As described above, the control centre can also add value to the data by for example calculating the most fuel efficient sailing plan and sailing speed for a vessel.

Data Quality

All data from the control centre 4, including forecast data, is provided with an estimate of the quality of the measurement or observation, i.e. with an uncertainty factor of the data. For example, the height of an object may be given as 30 m±1 m. Similarly, all the data obtained on the ship from the subsystems 13, 14 and the conventional instruments are stored with uncertainty measurements. Additionally, for each detected object, a data detection quality measure is provided indicating the probability of the detected data actually corresponding to the object displayed. The probability may be lower if, for example, the detected signal includes a large amount of noise. Consequently, the data quality measures associated with data sets provide both an indication of the probability of successful object detection and an estimate of the uncertainty of physical parameters.

The quality measure of raw data is determined in the calibration process for the instrument that gathered the data. However, if the data is derived as a forecast in a numerical simulation and/or synthesised from data from a number of different information sources, the quality measure of the resulting data is calculated from the quality of the original raw data used to derive the final value. The calculation of the accuracy of the data may be performed both in the control centre 4 and/or in the main processing device 20. For example, when the metocean data received from the control centre is combined with metocean data obtained in the subsystems 13, 14, the data received from the control centre is compared with the data obtained in the subsystems and a quality measure of the displayed data is calculated. The quality measure of the measurements and observations are also saved in the catalogue and storage units 15, 19. All quality assessments of measurements and observations are considered to be essential for the sea-master in any security, safety or navigational assessment.

Operation

Figure 7:
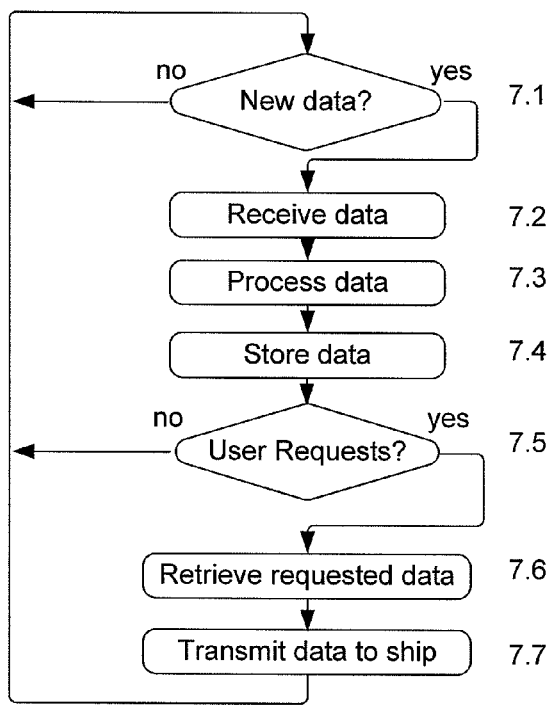
FIG. 7 illustrates a process of collecting and transmitting EO data in the control centre.

The operation of the system will now be described. Firstly, the processes carried out in one or more servers (not shown) at the control centre 4 will be described with reference to FIG. 7. At step 7.1, a process for checking whether new information has been received from any of the information sources is performed. The information is received patchily depending on, for example, the EO satellite orbit settings. If there is new information available, the new information is received at step 7.2, processed at step 7.3 and stored at step 7.4. The processing may involve geographically masking the data, such as discarding land areas, and checking the reliability of the data. It is desired that all data sets are processed with at least two different algorithms in order to assess the strengths and weaknesses thereof. Each set of data is stored with a confidence measure of the data set, i.e. the quality and accuracy of the data (see above).

The control centre 4 services a plurality of ships with information at any one time. Records in a database listing the ships that have active requests and the information they have requested are checked at step 7.5. A request from a ship for data is automatically made when the ship transmits its sailing plan or route to the control centre 4. The submission of the route plan to the control centre also initialises the transmission of metocean and target data from the ship to the control centre 4. The sailing plan is typically submitted at the beginning of the route. Moreover, the estimated speed of the ship is also submitted at the same time.

Using the sailing plan and the estimated speed, the time the ship will be at different locations along the route can be calculated in the control centre 4. The calculated time and location data serves as requests for new data from the control centre. Alternatively, a user can request new data by inputting the correct instructions to the main processing device and this will be described in more detail below with respect to FIG. 8.

For each user request, the new data requested is retrieved at step 7.6 and sent to the ship 1 at step 7.7. The system will then repeat the process and check for new data at step 7.1. If there are no other user requests, the system will return to checking for new data such that up-to-date data is available for immediate delivery.

Figure 8:
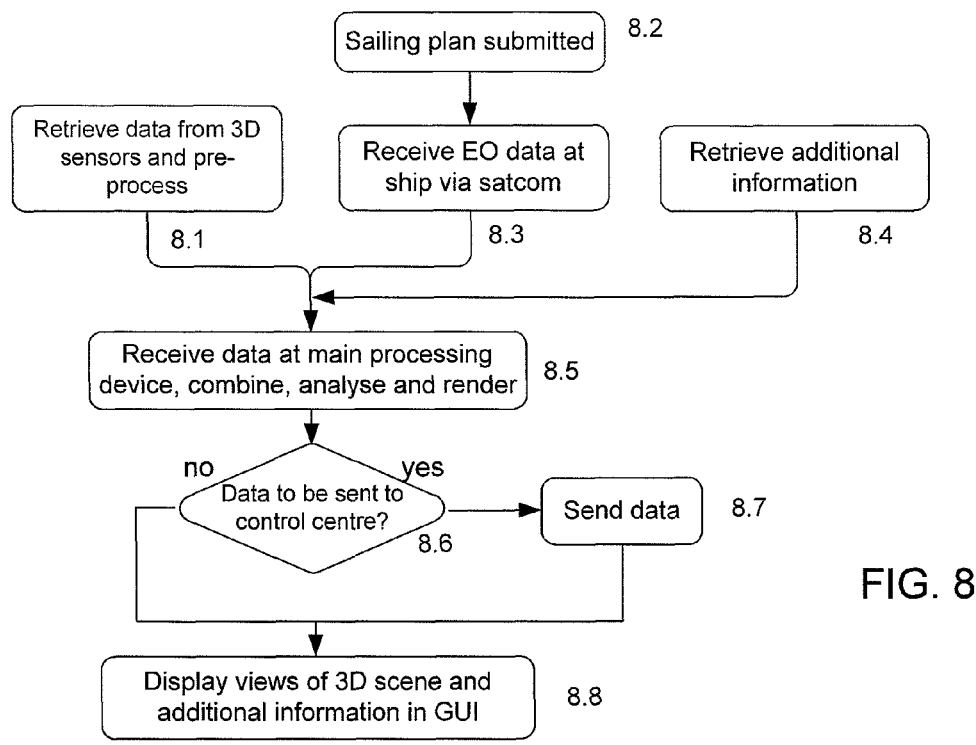
FIG. 8 illustrates a process of obtaining, analysing and presenting information to an end-user.

With reference to FIG. 8, the default process on the ship of collecting, analysing and displaying information to the end user will now be described. A number of separate processes for gathering and analysing data are run independently. Preferably, the radar and sonar subsystem are always on. However, when the ship is in harbour, it may not need to receive EO data from the control centre. At step 8.1, the radar and sonar subsystems are recording data from the sensors and performing initial pre-processing. Step 8.1 will be described in more detail below with respect to FIGS. 9 and 10.

At step 8.2, when the ship, for example, leaves the harbour, the sailing plan is submitted to the control centre 4. It also submits information about the estimated speed of the vessel along the route. The control centre 4 now has enough information to compute an estimate of the location of the ship at different points in time. The submission of the sailing plan is interpreted as a request for EO data. If the actual route deviates from the sailing plan during sailing, a new route will be calculated and submitted and the stored requests at the control centre 4 updated. The deviation between the sailing plan and the actual route is typically automatically calculated by comparing the current location of the ship, obtained using the GPS system, to the estimated location of the ship according to the sailing plan for the current time. Moreover, using the user input device and the graphical user interface, a user may also request specific information without submitting a sailing route.

At step 8.3, EO data from the control centre 4 is received via the Satcom 5. It is not necessary that the EO data from the control centre 4 is stored in the catalogue and storage unit 15 on the ship 1 since it may already be stored onshore on the catalogue and storage unit 19 and can be requested at any time.

Additionally, at step 8.4, additional data from the other ship sensors, typically connected to the NMEA interface 29 are obtained such as the position of the ship, local wind data, the bearing of the ship, etc. This information is also labelled and can be stored in the catalogue and storage service 15 on the ship 1. The data received through the NMEA interface 29 can be correlated with the information received from the control centre 4 and the radar and sonar subsystems. For example, the radar and sonar data may indicate a marine vessel in the vicinity of the ship 1. The detected marine vessel may also operate a system according to the invention and have sent its route and sensor data to the control centre 4. Additionally, the AIS 7 may have received identification data from the vessel. The data from the radar subsystem 13, the sonar subsystem 14, the control centre 4 and the AIS 7 can then be correlated such that a comprehensive set of data about the detected marine vessel can be presented to the end user of the system.

Steps 8.1, 8.3 and 8.4 are repeated as soon as there is new data available. However, these steps may not have to be performed in order. Any one of steps 8.1, 8.2 and 8.3 may be skipped. For example, new data from the radar and sonar subsystems are provided at a much higher frequency and in much greater detail than the additional information from the instruments connected to the NMEA interface 29. Consequently, there may not be new additional data from the instruments connected to the NMEA interface 29 every time the radar and sonar data have been updated. Moreover, steps 8.2 and 8.3 may be skipped entirely if the user is not interested in EO data.

At step 8.5, new data is received at the main processing device 20. The wired/wireless network interface 30 and the Satcom interface 31 in the main processing device 20 receive the information from the radar and sonar subsystems 13, 14 and the control centre 4 and decompresses and decodes the data. The data is then communicated to the integration unit 22.

In the integration unit, the data from the radar and sonar sensor subsystems 13, 14 and the control centre 4 is combined into a 3D scene. The integration unit checks the time stamps of each set of data and updates the separate parts of the scene independently when new data is available from the information sources responsible for that section of the scene. The combination of the data sets is performed with consideration to the different levels of accuracy and quality of information from different types of sensors. Additional data, including data received over the NMEA interface as well as data received from the radar and sonar subsystems and the control centre, is used to assist in the interpretation and visualisation process. Moreover, if data of the same observation is received from more than one information source, a new set of data, derived from both of the original data sets, may be synthesised in order to improve the overall quality. The state of the scene is evaluated and analysed and important information in the scene is flagged up. One or more views of the current scene are then rendered in accordance with user instructions and passed on to the GUI 24. Different analysis of the information can also be performed in dependence on user instructions.

Any additional data that may be relevant to the user and which is not included in the 3D scene is also forwarded to the GUI to be displayed as numerical data. The additional data may derive from data received over the NMEA interface but also from the radar and sonar subsystems and the control centre.

The results of the processing of the data are correctly labelled and stored in the catalogue and storage service 15. Typically, only the raw data and the final processed data sets are stored in the catalogue and storage unit 15. The intermediary data sets are not stored as they can be derived again from the stored raw data.

The processes carried out in the integration unit 22 will be described in more detail below with respect to FIG. 11.

With reference to FIG. 8, at step 8.6, the system determines whether any of the raw or processed data should be sent to the control centre 4. For example, if the ship has opened a communication link with the control centre 4 by submitting its sailing route, or by any other means, such that it is receiving information from other ships via the control centre, the operator of the ship 1 may be willing to share the data gathered on the ship 1 (e.g. metocean data) with other ships through the control centre. If any information is considered to be relevant for other ships and the operator has authorised communication of data to the control centre, the procedure continues to step 8.7 and the data is transmitted. After the data has been transmitted or simultaneously with the data being transmitted, the system proceeds to step 8.8. If the ship is not sharing data the system proceeds to step 8.8 directly without transmitting any data to the control centre 4.

At step 8.8, the GUI 24 receives information from the integration unit 22. The GUI controls the display 25 to display the rendered views of the 3D scene, a lateral 2D view of the ship and its surroundings and additional data. It also emphasises important information in the scene, such as a particularly close object and/or the estimated time of impact of the ship and an object, if the object continues in its current course. Additional data, such as wind, speed, depth, current, etc, is displayed in tables in numerical form.

It should be noted that FIG. 8 is only one example of the process of obtaining, analysing and presenting information to an end-user. The steps can be performed in different order and be triggered by different events. FIG. 8 should be interpreted as exemplary only and not limiting.

Figure 9:
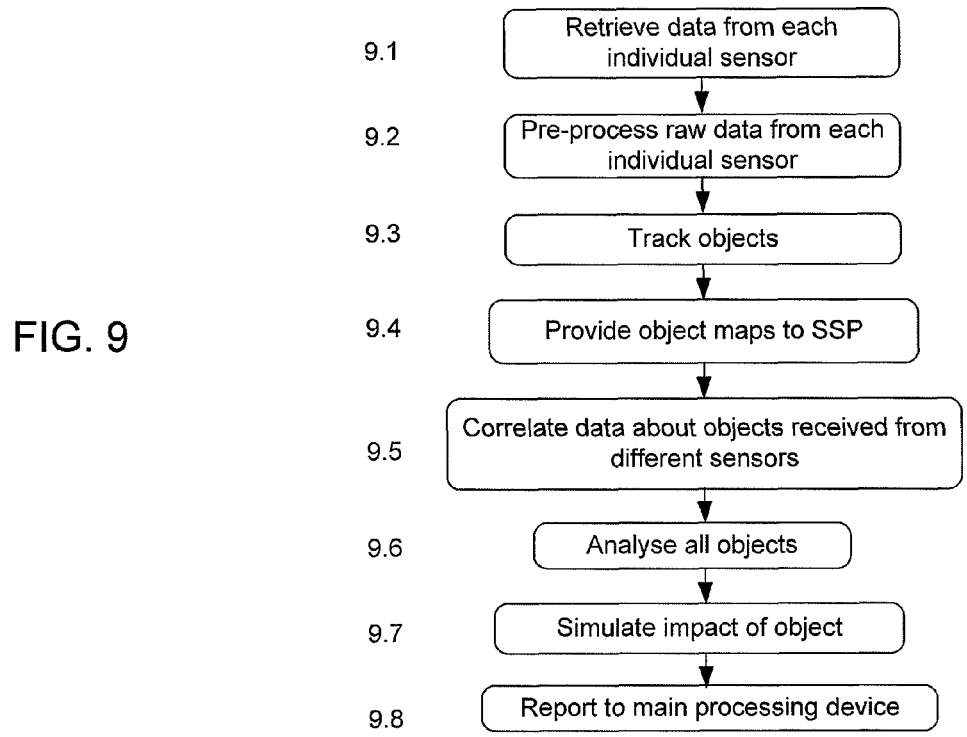
FIG. 9 illustrates a process of obtaining and pre-processing information from the radar and sonar subsystems.

Step 8.1 will now be described in more detail with respect to FIGS. 9 and 10. The data from the subsystem may be processed to provide either object maps or true image maps of the objects in the vicinity of the ship.

An object map is using data from the returns of objects to associate returns and thereby classify the target, measure the extent of the target, its position and speed. An object map is typically displayed as symbolic representations of the objects, like for example icons. A true image map (e.g. a bitmap) is using advanced techniques to create a video-like image of the object.

Less memory and processing power are required to provide object maps than to provide image maps and consequently most sensor data is only used to create object maps by default. The process of providing object maps will be described with reference to FIG. 9. The process of providing image maps will be described with reference to FIG. 10.

When the system is in use, the radar and sonar sensors are transmitting pulses for reflection off objects in the vicinity of the ship. At step 9.1, the reflected signals are received and passed to the DSPs for pre-processing at step 9.2. The presence of data in the pre-processed signals that indicates object in the vicinity of the ship is then detected and the detected objects are tracked at step 9.3. The process of tracking objects is typically carried out in the tracking processors 44, 47 of the radar and sonar subsystems 13, 14, respectively. In addition to objects such as marine vessels and buoys, the radar and sonar subsystems 13, 14 may also obtain metocean and other environmental observation data. For example, the radar subsystem may obtain high wave observation data and the sonar subsystem may obtain ocean current data.

At step 9.4, object maps are provided from each sensor to the radar or the sonar sub-system processor 45, 48 depending on whether the data is radar and sonar data. At step 9.5 the sub-system processors correlate the object maps from the different sensors and co-register objects. For example, it is likely that two sensors have detected the same object, for example when the ship is moving or when the fields of view of the two sensors overlap. After each object has been registered the objects are analysed at step 9.6. The position of each static or dynamic object is converted from coordinates relative to the sensors to ship coordinates. Moreover, the direction and speed of each dynamic object is computed. The speed can be found either by analysing the trajectory of the object against time and/or by analysing the Doppler shift in the reflected signals from the object. The motion of the ship 1 is also taken into account. The potential impact between an object and the ship 1 is simulated and if an impact is likely, the time and point of impact is computed at step 9.7. The results of the analysis and the processed object maps are then reported to the main processing device 20 at step 9.8. The main processing device also receives the numerical data for the speed, direction and the time of impact with the ship of each dynamic object close to the ship.

In the GUI, all the objects are by default represented by graphical symbols. Consequently, a large boat is represented by a graphical symbol of a large boat and a dinghy is represented by a graphical symbol of a dinghy. It is also contemplated that inherent features of some types and brands of vessels and objects can be detected by the sensors and graphical symbols for the objects selected to correspond to the type and brand of the detected object. However, in some circumstances, a user may want to see a true 3D image of the object. For example, in contrast to a graphical symbol, a true image of a vessel may show the number of people on the vessel and the shape of the vessel. Higher processing power and more memory is required to generate a true 3D image of an object than to select a graphical symbol for the object. Consequently, graphical symbols of objects are provided by default. However, a true 3D image of an object or a section of the surroundings can be requested by the end user, for example, by double-clicking on the object or a section in the GUI 24. Alternatively, the system can auto-generate 3D imagery of predefined sections of the 3D scene, predetermined object types or in predefined geographical areas. For example, along some sailing routes, where a great number of various types of objects in the vicinity of the ship are expected, the settings in the system may indicate that true images should be generated for all objects. Additionally, the settings of the system may trigger a true image to be generated for an object if a simulation indicates that object is on a collision heading with the ship 1 or if an object is heading in the direction of the ship when the ship is in a harbour.

Figure 10:
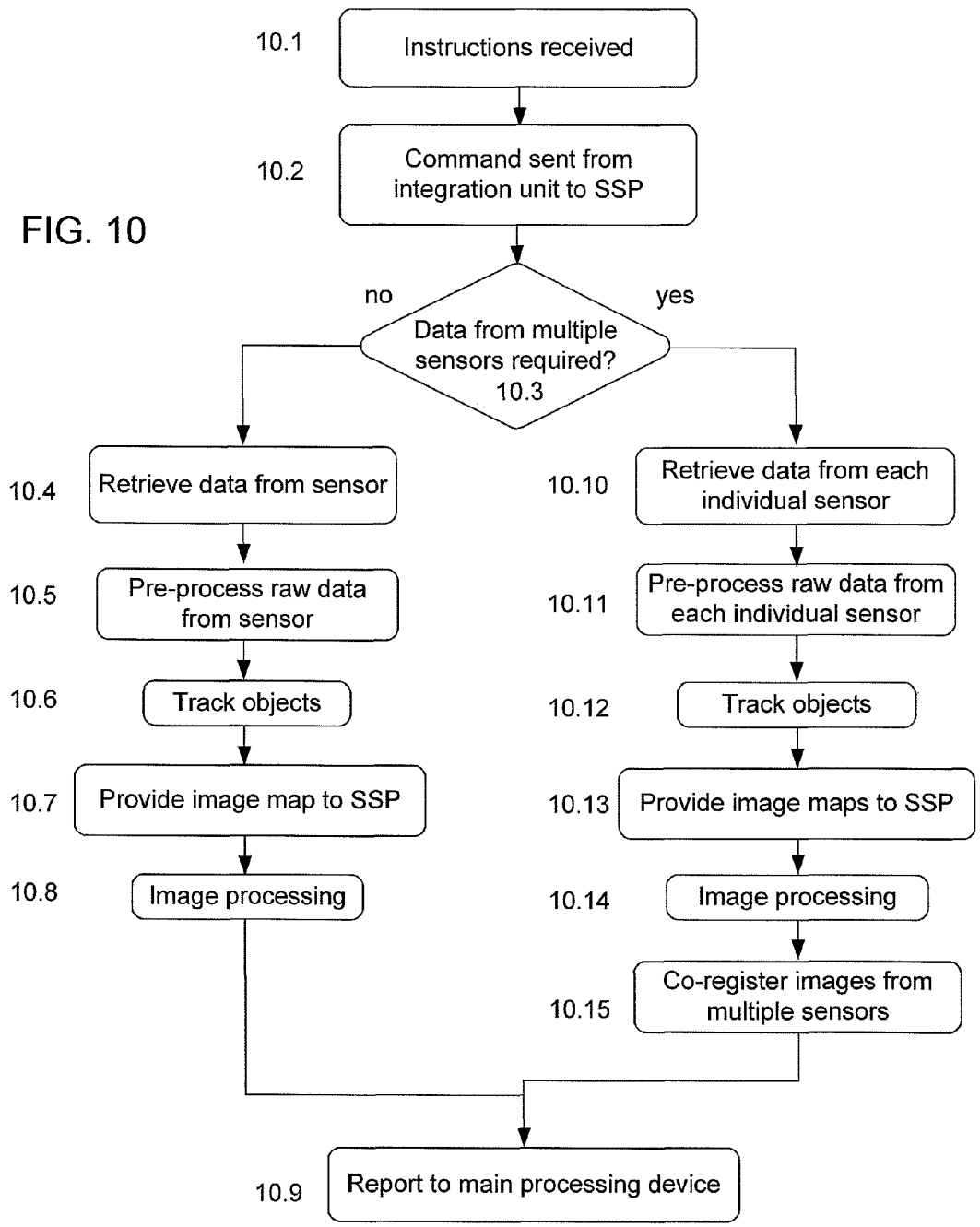
FIG. 10 illustrates another process of obtaining and pre-processing information from the radar and sonar subsystems.

With reference to FIG. 10, the processes of requesting and generating a true image of an object will now be described. Instructions to generate true images of objects are received in the integration unit 22. The instructions may be generated as a result of user input received in the main processing device or as a result of pre-stored settings in the system. The integration unit computes the area in ship coordinates and the time frame to which the user request relates. The integration unit also selects whether radar, sonar or both radar and sonar data is required. Depending on whether the user request relates to radar or sonar data, the integration unit transmits the user request to either the radar SSP 45, the sonar SSP 48 or both via the wired/wireless network interface 30 at step 10.2. The SSPs 45, 48 determines whether the user request relates to more than one sensor at step 10.3. For example, if a user has selected a large section of the 3D scene, data from multiple sensors will be required to provide a true 3D image of the whole section. However, if the user has only selected a single object, it is likely that only data from one of the sensors is required. The sensor data for which a user request for a true image does not apply is processed in the manner described with respect to FIG. 9.

If it is determined that data from only one sensor is required to fulfil the user request, the process proceeds to step 10.4 and the data from the relevant sensor is retrieved. The data is then pre-processed in the DSP at step 10.5. The pre-processing may include additional processing to that of step 9.2 for generating an object map in order to prepare the higher quality image. The data is then passed to the tracking unit at step 10.6 and the objects are tracked. The resulting object map is transmitted to the SSP at step 10.7. At step 10.8, the SSP performs image processing, for example interferometric synthetic aperture radar image processing. Interferometric synthetic aperture image processing is known in the art and therefore not described in detail herein. It will furthermore perform post processing, including, for example, converting the image into ship coordinates. At step 10.9, the image map is transmitted to the main processing device 20.

If, at step 10.3, it is determined that data from multiple sensors are needed to fulfil the user request, the process proceeds to step 10.10 and data from all the relevant sensors are retrieved. Data from each object is then pre-processed at step 10.11 as described with respect to step 10.5 for data from a single sensor. Object tracking is then carried out at step 10.12 for each data set. The resulting image maps are then transmitted to the radar and/or sonar SSPs 45, 48 at step 10.13 and image processing is carried out at step 10.14. All images and objects are co-registered in the SSP at step 10.15. Although step 10.14 and step 10.15 have been described as separate steps, the co-registration can be performed as part of the image processing step. The image processing might include a synthesised and distributed processing function as data and processing power between the SSPs can be interchanged in order to improve the overall quality and throughput time of the co-registered images from the multiple sensors. The image maps are then transmitted to the main processing device 20.

Consequently, whereas previously if a ship approached an object in dense fog at night the object would show up as a small clutter point on a conventional radar screen, the system according to the invention would show on the display that the object is, for example, a dinghy. The main processing device 20 runs automatic procedures to select which object(s) to be processed to full imagery and to be displayed as true images. This could for example be all objects that are on a collision heading or all objects heading towards the ship while at anchor. Manual or automatic selection of the dinghy would cause the system to generate a true image of the dinghy showing that it is a dinghy with two persons onboard having an outboard engine. Moreover, numerical information of the object would inform the user that the dingy is sailing at 25 knots directly towards the ship.

Figure 11:
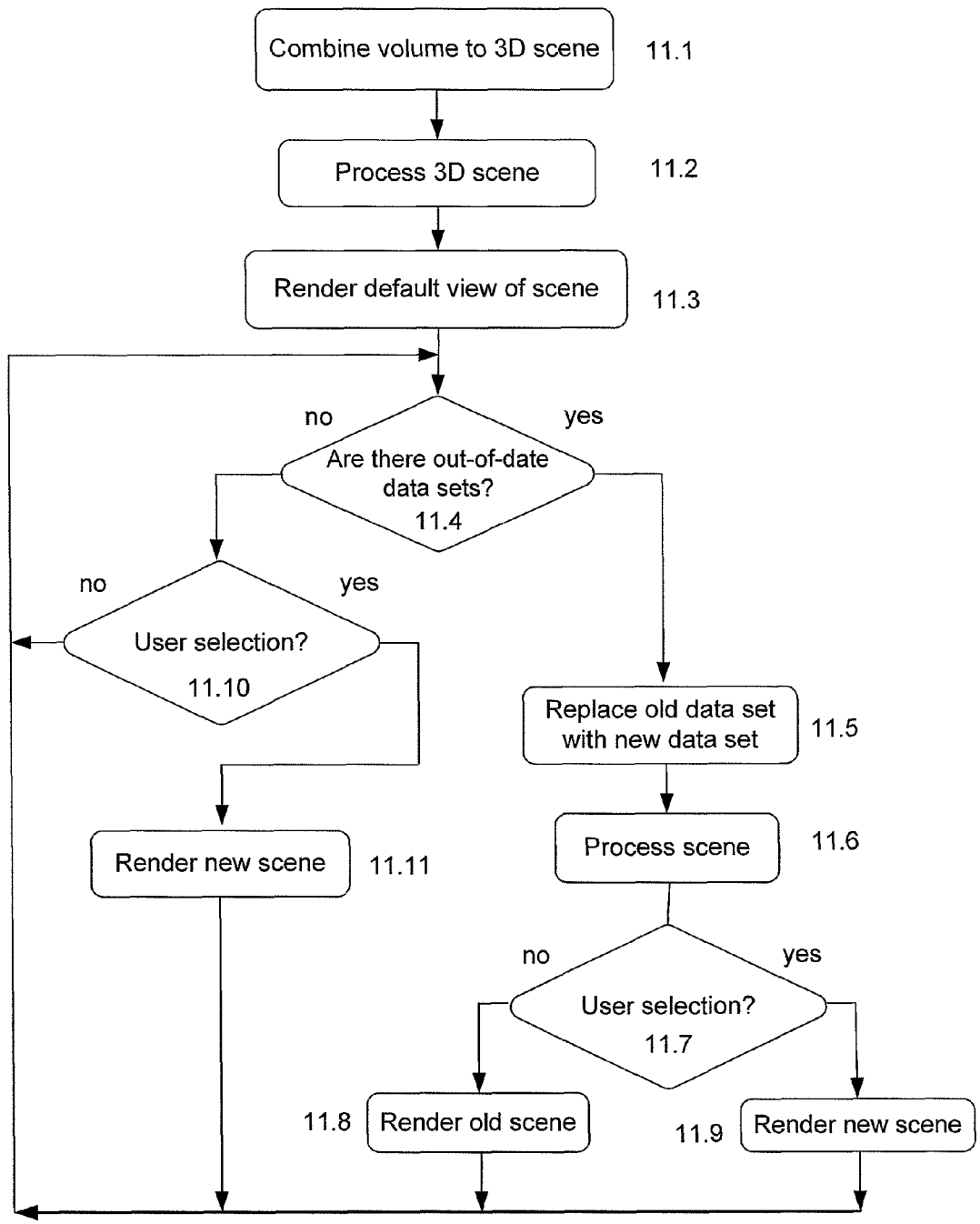
FIG. 11 illustrates a process of creating and processing a 3D scene of the surroundings of the ship.

Referring to FIG. 11, the steps carried out in the integration unit 22, i.e. step 8.5 of FIG. 8, will now be described in more detail. After the integration unit 22 has received all available data from the sensors and the control centre 4, the data is combined into a complete 3D scene at step 11.1. The objects in the scene are then processed at step 11.2. For example, the processing may include identifying the closest object in time and/or space and collating all the information available from the various information sources about the object. It is contemplated that for a limited number of the closer objects, numerical information indicating the distance to the object, the bearing and course of the object, the speed, the position and details about a potential impact between the object and the ship 1 will be collated by the integration unit for display. The information for the closest object is displayed by default. Moreover, the user may define an alarm zone around the ship and all objects in the alarm zone may be highlighted. Moreover, a process to open a separate pop-up window identifying the objects in the alarm zone may be triggered. The system may also trigger the generation of true images of the objects of interest. Moreover, if the object is an unusually high wave, the main processing system may collect all the information available about the sea state received from the control centre 4 and the other instruments on the ship 1 for display. Additionally, an alarm may be raised and a pop-up window providing information about the hazardous wave may be opened in the GUI.

With reference to step 11.3 of FIG. 11, when the system is first initialised, a default view of the 3D scene is rendered. This could, for example, be a perspective view of the scene from above, the side or below. The exact details of the default scene can be different for different end users and stored in the end user's personal profile in storage 28. Also, in addition to the view of the 3D scene described above, a lateral 2D view of the ship and its surroundings corresponding to a plane of the 3D scene in which the central axis of the ship lies are rendered. Moreover, additional information related to the ship and its surroundings is rendered in either numerical or graphical format. The different views in the GUI are discussed in more detail with respect to FIGS. 12 to 19.

The sensors operate according to different update frequencies and different data sets of the scene are updated at different times. For example, the radar system updates its information regularly, at typically 100 times a second. In contrast, the information supplied from the control centre 4 arrives when the control centre has received new information, which typically happens less often. However, the 3D scene has to be updated as soon as new data is available. Only the part of the scene for which new data exists is updated. If there are new data sets at step 11.4, the process continues to step 11.5 and the old data sets are replaced by the new data sets. The new scene is then processed at step 11.6.

The integration unit 22 also checks repeatedly for user input from the user input devices 23. The graphical user interface allows the user to see the 3D scene from any view and the integration unit must render a new view responsive to each new instruction received from the user through a user input device 23. The graphical user interface also allows the user to see a lateral backward and forward view of the ship and its surroundings. These views will be described in more detail with reference to FIGS. 12 to 19.

With respect to FIG. 11, user selections are checked at step 11.7 after the old data sets have been replaced and the new data scene processed. If a new selection has been made since the last time a view was rendered, a new view based on the new selection will be rendered using the updated data at step 11.9. If no new user selections have been detected, the old view using the updated data is rendered at step 11.8. The rendered views are passed to the GUI 24 for the display 25.

In contrast, if no out-of-date data sets had existed at step 11.4, the process would continue to step 11.10 to check whether the user had made a selection to render a new view of the old data set. If a new user selection has been registered, a new view based on the new user selection is rendered at step 11.11. If a new user selection has not been registered, the system will return to check for new updates to the data sets at step 11.4.

Graphical User Interface

One example of a GUI for operating the system according to the invention will now be described. It should be recognised that the described GUI is only one example and other suitable arrangements of the GUI are possible. The graphical user interface uses 3D visualisations software to display the data to the user. The 3D visualisation software may include, but is not limited to, OpenGL and similar software. It further uses libraries suitable for providing 3D observations on a 3D screen or 2D screen and which allow the processing of both historical data and real time data flows.

Conventional software for allowing a user to see a slice, a view or a true image view of a 3D scene use 3D data sets, which are typically combined from a plurality of 2D data sets. However, in the described example of the system according to the invention, the 3D data sets are received directly from the subsystems, which record observations in 3D, and are not a combination of 2D data sets. Consequently, the 3D visualisation software according to the invention is adapted to have functions that accept 3D data sets as an input.

Figure 12:
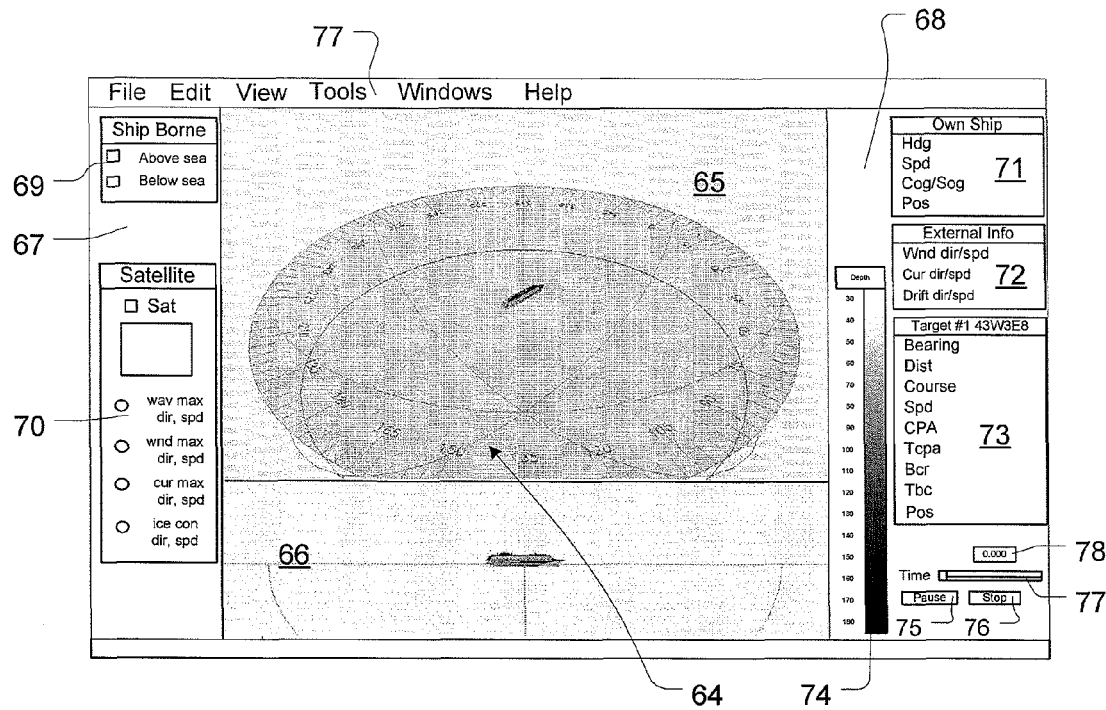
FIGS. 12 to 19 illustrate the functionality of the graphical user interface.
Figure 13:
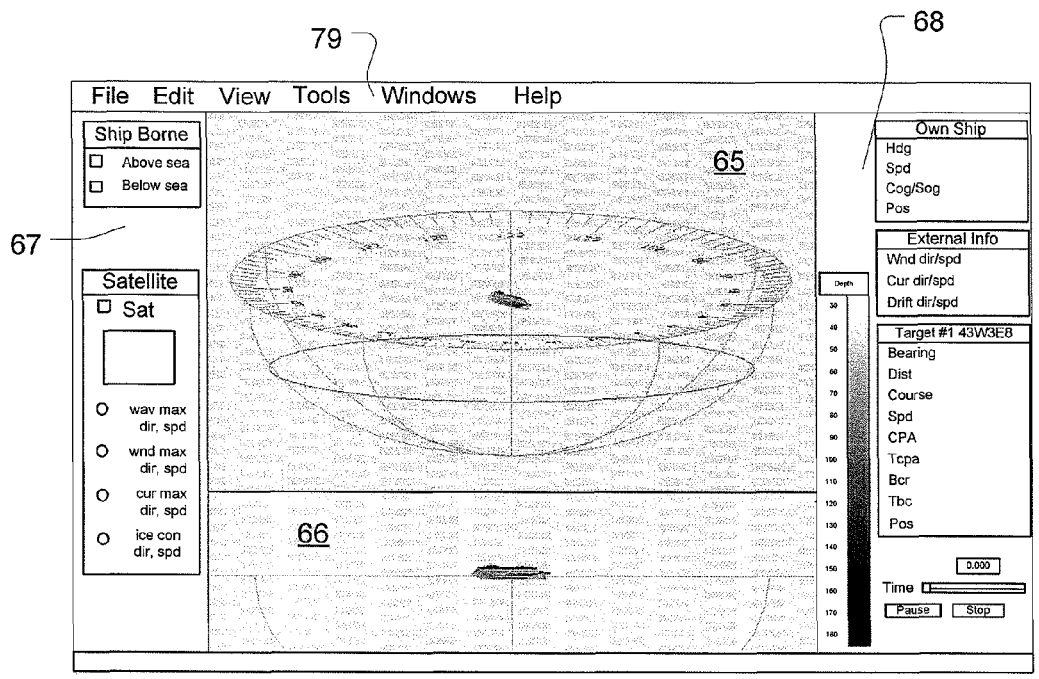

With reference to FIGS. 12 and 13, the graphical user interface according to one embodiment of the invention includes a central window 64 showing a major view 65 of the ship 1 including observations both below and above the surface. It is contemplated that the memory 27 of the main processing device stores images of most commercially available ships and that the image in the graphical user interface of the ship on which the main processing device is installed accurately depicts the features of the ship 1.

By clicking and dragging a cursor using a user input device 23, any view of a 3D scene of the environment of the ship can be displayed as the major view 65. The scene allows a 360-degree view of the ship and its surroundings and the selected view can be rotated freely in 3D space using user input device 23. The major view 65 of FIG. 12 shows the ship from a viewpoint slightly above the plane of the ship, whereas the major view 65 of FIG. 13 shows the ship from a viewpoint slightly below the surface.

The GUI 24 also provides a zooming function. The zooming function lets the user zoom in or out to see an overview or a detailed view of the ship surroundings. The level of detail in the major view changes depending on the degree of zooming.

The central window 64 of the graphical user interface also includes a minor view 66 showing a smaller lateral forward and backward view of the ship and its surroundings. The data in the minor view 66 is taken from a slice of the 3D scene defined by the lateral plane of the ship. The lateral view can be rotated about the central axis of the ship.

The major and minor views of FIGS. 12 and 13 display the ship before any data from the 3D radar and sonar systems and the control centre have been passed to the GUI. Consequently, no objects or metocean data around the ship are shown.

Additionally, the GUI includes a source window 67 on the left hand side of the central window 64 and an information window 68 on the right hand side.

The source window 67 allows the user to indicate the information sources from which the information in the major and minor views should be derived. It includes a ship borne sensor area 69 and a satellite area 70. The ship borne sensor area 69 allows the user to select whether to view data from the radar subsystem 13, the sonar subsystem 14, both or neither. Checking the checkbox next to "Above Sea" instructs the integration unit 22 to display data from the radar subsystem 13 in the display. Checking the checkbox next to "Below Sea" instructs the integration unit to display data from the sonar subsystem 14 in the display in the major and minor views. By default, both the checkboxes for "Above Sea" and "Below Sea" are checked.

The satellite area 70 allows the user to instruct the integration unit whether to add a layer of EO data within the major view 65 and the minor view 66. Checking the checkbox next to the label "Sat" triggers the integration unit 22 to display the EO data received from the control centre 4. This checkbox is checked by default. It should be recognised that although this area is labelled "Sat", the information for providing the layer of EO data may be received via wireless Internet instead of via a communication satellite when the ship is in a harbour.

The type of EO data displayed can be controlled by the user using the controls in the satellite area 70. The user can request wave, wind, current and sea ice state data using a number of radio buttons in the satellite area 70. The direction, speed and the maximum amplitude of the waves, the wind speed and direction and the current speed and direction are typically provided. The user can also request sea ice state data from the control centre, providing the user with ice concentration, ice drift, ice edge (indicated by a 0% ice concentration contour) and iceberg information (indicated by a 100% ice concentration in open water), using the radio buttons.

Checking the "Sat" checkbox allows a communication channel to the control centre to be opened up. When the operator defines a sailing plan for the ship, the sailing route is automatically submitted to the control centre 4. The submission of the sailing plan is interpreted at the control centre as a request for EO data. Moreover, the fact that the checkbox is checked is also interpreted by the system as authorisation to send observation data from the ship to the control centre 4. If the checkbox is not checked, when the sailing plan is defined, the sailing route is not automatically sent to the control centre and no request for EO data is registered in the control centre 4. Similarly, if the sailing plan is amended, the request is automatically updated in the control centre. If the checkbox is not checked, the updated sailing plan will not automatically be communicated to the control centre. However, even if the sailing plan has not been registered at the control centre 4, a request for control centre data can later be submitted by checking the "Sat" checkbox or by using the GUI menus to establish a connection to the control centre. Either the sailing plan is submitted at that time or specific EO data defined by the location of the ship and the current time is obtained.

In another embodiment, the sailing plan is submitted whether or not the checkbox is checked. Checking the checkbox only triggers the display of the data requested. Moreover, the request for EO data from the control centre does not necessarily have to be defined by the sailing plan. It is contemplated that in one embodiment, repeated requests for EO data are sent by the integration unit, if the checkbox is checked, based on the current location of the ship. The type of EO data required, for example wind data, is determined in dependence on which checkboxes are checked in the satellite area 70. Moreover, the area and time interval for the requested EO data is determined based on the state of the zoom function of the 3D view and the time slider 77 respectively by the integration unit 22. The relevant instructions are then sent via the Satcom 5 or over the Internet to the control centre 4.

In the source-setting window 67 of FIGS. 12 and 13, all the checkboxes are unchecked, indicating that the GUI is not receiving any data from the integration unit 22.

In the information window 68, additional numerical data is presented. The numerical data displayed are predominantly derived from data collated by the external sensors on the ship, i.e. the conventional instruments connected to the NMEA interface 29. However, it also comprises information derived from the data from the radar and sonar subsystems and the EO data from the control centre. The numerical data window includes an area for data about the ship itself 71, an area for external data 72, and an area 73 listing the data for one out of up to six objects in close proximity to the ship. Additionally, there is a graphical depth indicator 74, which shows the depth range associated with the 3D scene shown in the major and minor views. Underneath the area for listing the data for one out of up to six objects, there is also provided an area for controlling the system to show historical, in situ or forecast data, with the help of a time slider, which will be described in more detail below.

The data in the ship data area 71 typically includes the heading, speed, course over ground, speed over ground and the latitude and longitude of the ship. The data in the external data area 72 typically includes the direction and speed of the wind, the direction and speed of the current and the direction and speed of the drift. The data in the ship data area 71 and the external data area 72 is retrieved from the conventional instruments located on the ship.

The target area 73 includes information about the surrounding objects such as the bearing of an object, the distance from the object to the ship, the course and the speed of the object, the closest point of approach and the time to the closest point of approach between the ship 1 and the object, the bow crossing range and the time to bow crossing range and the latitude and longitude of the object. If the object is a vessel with an AIS system, the target area may also display the AIS identification number of the vessel, which may be received from the AIS system. It may be confirmed using the data from the control centre 4 if the other ship operates the system according to the invention. If not, passive AIS receivers (for example onboard satellites) can be accessed by the control centre to independently communicate AIS identification. The characteristics of the AIS info sent by another ship can be correlated by the information extracted by the described system. For example, the position of the other ship can be confirmed by the data from the radar and sonar subsystems.

The depth indicator 74 is a graphical indicator in colour indicating the depth to the seabed associated with the 3D scene shown in the major and the minor view. For example, if the depth to the seabed shown in the major and minor view varies between 10 m and 100 m, the depth indicator will show colours associated with a depth range of 10 m to 100 m. The depth data presented is derived from the sonar data from the sonar subsystem 14.

Additionally, there is provided a control 75 for pausing the system and a control 76 for stopping the system. Pausing the system allows a user to analyse a scene in detail before the scene is updated with new data. There is further provided a control for rewinding or forwarding the system to see historical or forecast data. In FIGS. 12 and 13, the control for rewinding and forwarding the system is provided in the form of a graphical time slider 77. The user can retrieve historical data with a particular time stamp by sliding the bar to the left and retrieve forecast data by sliding the bar to the right. The time the system has been rewound/forwarded is shown in a display window 78. The time slider would typically allow a user to rewind and forward the system 24h in either direction. However, any other suitable time periods may be used.

The forwarding functionality allows the user to retrieve information about simulated impacts with objects detected by the subsystems and forecasted EO data when the "Sat" checkbox is checked. Along with in situ data, the control centre 4 also gathers and sends the ship 1 forecast data for the points along the submitted sailing plan. By checking the checkbox and sliding the time bar forward, the forecast data is retrieved and passed from the integration unit to the GUI and then displayed in the EO layer in the GUI. If a request for EO data defined by the sailing plan has previously been submitted, forecast data would already have been received from the control centre. However, if a request has not previously been transmitted, a new request is transmitted from the integration unit to the control centre 4 when the checkbox is checked.

It is contemplated that the system stores the data sets for the 3D scenes for a predetermined period of time in the memory 27 before transferring it to the Catalogue and Storage unit 15. Consequently, if the system is only rewound for a period of time shorter than a predetermined time period, the historical data is retrieved from the memory 27. However, earlier data has to be retrieved form the Catalogue and Storage unit 15. Similarly, forecast EO data relevant for the submitted route and received from the control centre is saved in memory 27 until the time of reaching its destination. If updated forecast data is received, the forecast data in memory may be replaced.

The graphical user interface may be implemented in a Windows environment and a top bar 79 providing the window menus such as "File", "Edit", "View", "Tools", "Windows" and "Help" may be provided at the top of the graphical user interface. By selecting the menu "File", the user of the system can change user profiles, preferences, open previously defined sailing plans, save specific events and exit the system. By selecting the menu "Edit", the user can access functions such as "copy" and "screen dump", which allows the user to copy and print selected views displayed in the graphical user interface. The menu "View" provides the user with an option to select a suitable mode of the graphical user interface, for example, cruise mode, docking mode, security mode or anchor mode which will be described in more detail below. It also allows the user to reset the view of the surroundings of the ship in the major and minor views and to select specific views such as from the top or from the side. The "Tools" menu provides functions for recording errors in the system and for changing the alarm settings and the colour settings. By selecting menu option "Windows", the windows displayed in FIGS. 12 and 13 can be closed or opened as will be described in more detail below. The "Help" menu allows the user to seek help with various aspect of the system. It also provides the user with details about the providers of the system according to the invention. It should be realised that the menu options discussed herein are only examples of menu options and any suitable options can be provided.

Figure 14:
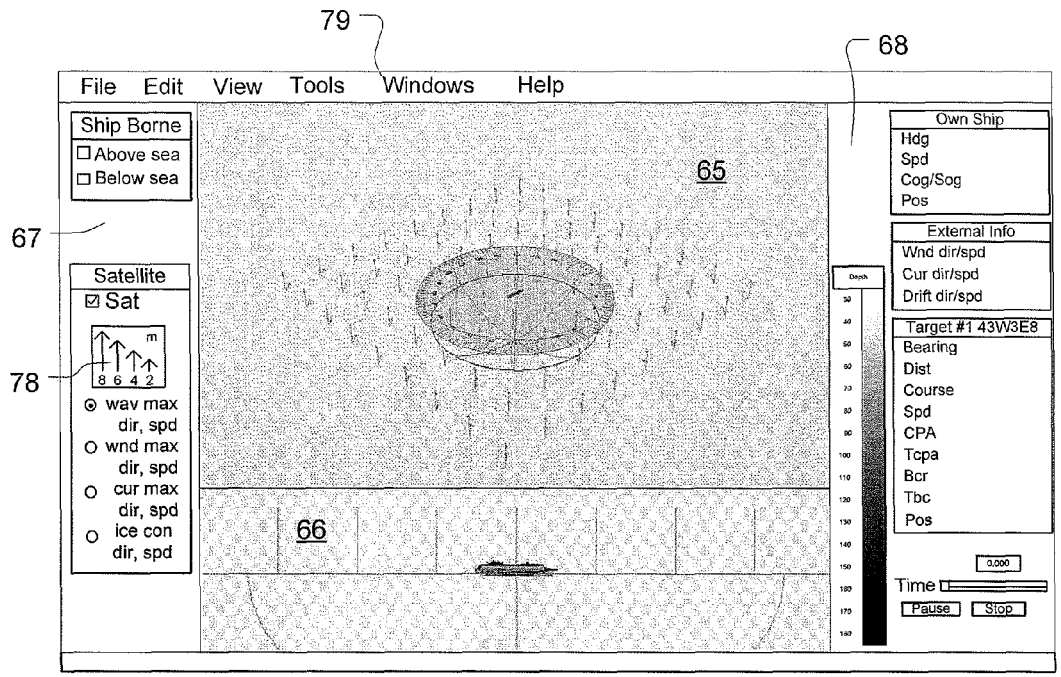

Referring to FIG. 14, the checkbox for satellite data is checked and wave data is selected. The major and minor views now show wave data in a region represented by a vector field around the ship. A box 80 below the "Sat" label indicates the corresponding height in meters of the vectors indicating waves, shown in the major and minor views. The wave propagation direction is indicated by the arrows of the horizontal vectors.

As described above, when the satellite checkbox in the GUI 24 is checked, the integration unit 22 retrieves the desired data from the control centre 4 or from memory if already received. The data received in response to the request can include satellite data, onshore observations, offshore observations and numerical model data. The offshore observations also include observations from other ships sailing in the same area as the ship 1. Similarly, ship 1 is sending its own observations together with its position to the control centre 4. In this respect, the temporal and spatial sampling of data for a particular observation is greatly improved.

By clicking on observation points in the EO data layer, shown in the major view 65 and the minor view 66, in the graphical user interface, the exact measure of the parameter is provided, including the quality of the data. For example, the wave propagation direction may be given as $280° \pm 3°$. Moreover, in addition to the parameters given above, clicking on the observational point may open up a window in which, for example values for the maximum height, average height, propagation speed and direction of the waves is provided. The operator can also select to have all metocean data for the area shown for that observation point. This would include wave, wind and current data for that location.

The information provided as part of the EO layer may not be exclusively derived from information received from the control centre 4. The data may be synthesised from a combination of the information received from the control centre, the subsystems 13, 14 and the other ship borne instruments in order to improve the overall accuracy of the displayed observations. All these observations may be sent to the control centre 4.

It should be understood that the parameters discussed above are only examples of parameters and the EO layer could provide any suitable metocean parameters. It should also be realised by the skilled person that FIG. 14 is intended to be exemplary only and the manner of presenting the data to the user shown herein is only one of several possible ways of presenting the data.

Figure 15:
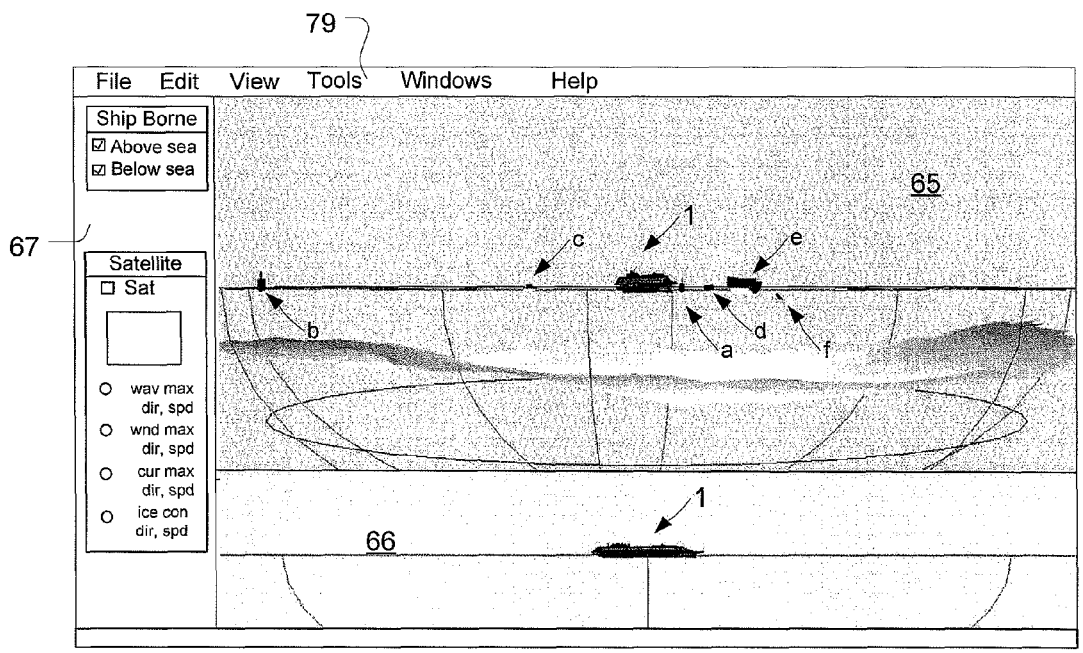

Referring to FIG. 15, the information window 68 has been closed to provide larger major and minor views. The different views can be closed and opened by selecting the menu "view" and selecting the views that are to be displayed. The source-setting window 67 indicates that the GUI 24 is displaying data from the 3D radar and sonar systems. No data from the control centre 4 is being displayed. The major view 65 shows a hemisphere around the ship 1, in which an upper plane of the hemisphere corresponds to the surface of the water. The ship 1, in the centre of the upper plane of the hemisphere, is shown from the side. The radar and sonar data indicates two buoys, a, b, a fishing boat, c, a dinghy, d, a larger fishing boat, e, and a diver, f, in the vicinity of the ship 1. It also shows the seabed below the ship. Clicking with the right hand mouse button on any of the objects in the display triggers a menu (not shown) and an option from the menu results in the numerical data for the object being displayed in the target area 73, or a true image to be produced in a pop-up window (not shown in FIG. 15). The menu further lets the user extract and add info about the object. Furthermore, the user can track the object over time and allow alarm functions to be triggered at various specific points along the course of the object, as will be described in more detail with respect to FIG. 20.

The graphical representations of the objects in the vicinity of the ship are not true images of the objects but symbols stored in memory corresponding to the type and/or brand of the object detected. If the end user wants to investigate any of the objects in more detail, the object can be selected and a true high quality image of the object can be requested as described with respect to FIG. 9. The object is selected by double-clicking thereon. Alternatively, the object can be selected by clicking on the object with the right hand side mouse key and selecting an appropriate option.

As shown in the minor view 66, no objects are located in the slice of the 3D scene defined by the plane of the ship. However, a lateral cross section of the seabed underneath the ship is shown in the view.

Figure 16:
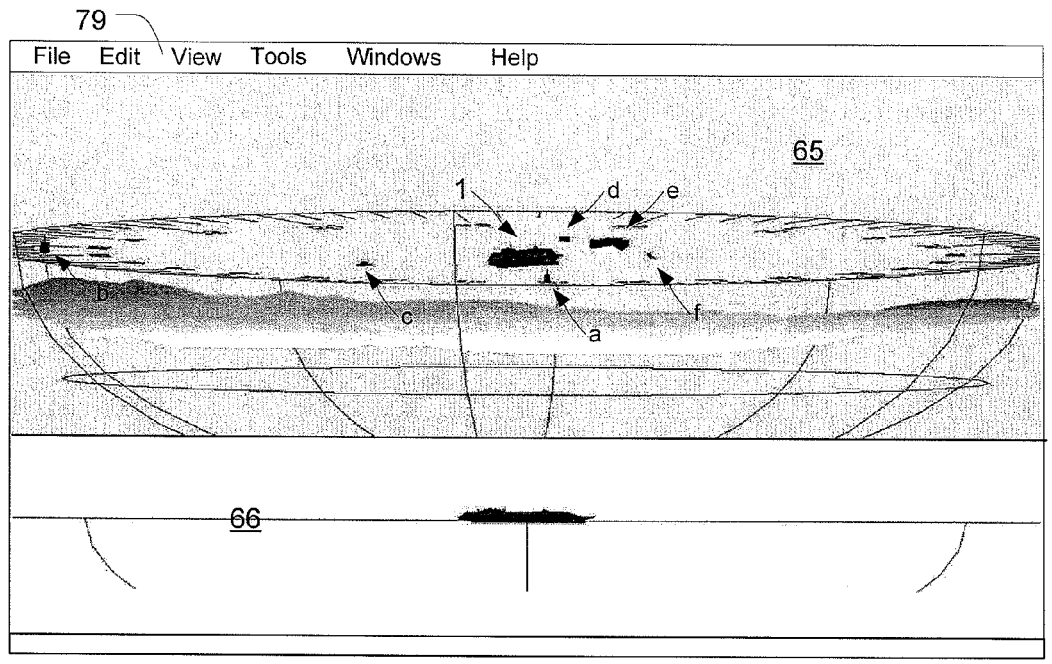

With reference to FIG. 16, the objects of FIG. 15 are now shown from a slightly different viewpoint, a little above the ship. Moreover, the source window 67 has also been closed to provide maximised major and minor views.

Figure 17:
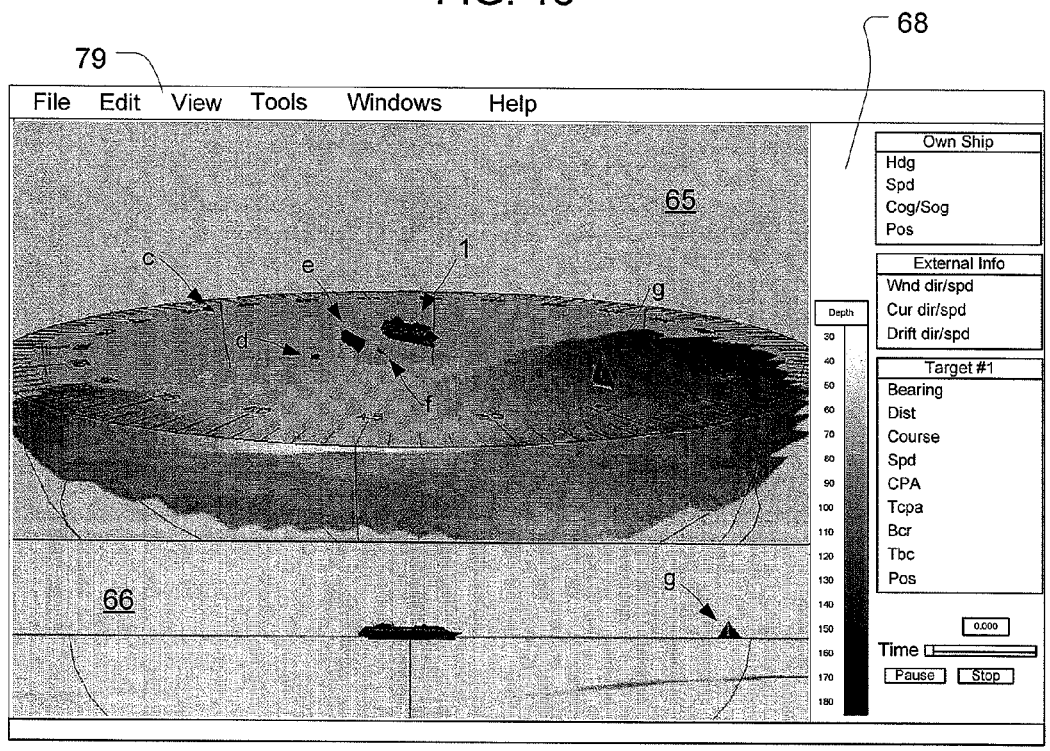

With reference to FIG. 17, another example of a configuration of objects is shown. The information window 68 is now open again. The ship and its surroundings are viewed from a viewpoint located slightly above the ship. The major view 65 includes the small fishing boat, c, behind the ship, at the outskirts of the 3D scene, the larger fishing boat, e, a diver, f, a dinghy, d, near the ship 1 and a sailing boat, g, some distance ahead of the ship going in the opposite direction to the ship. The minor view 66 shows that the sailing boat, g, is located in the direction of travel of the ship 1.

Figure 18:
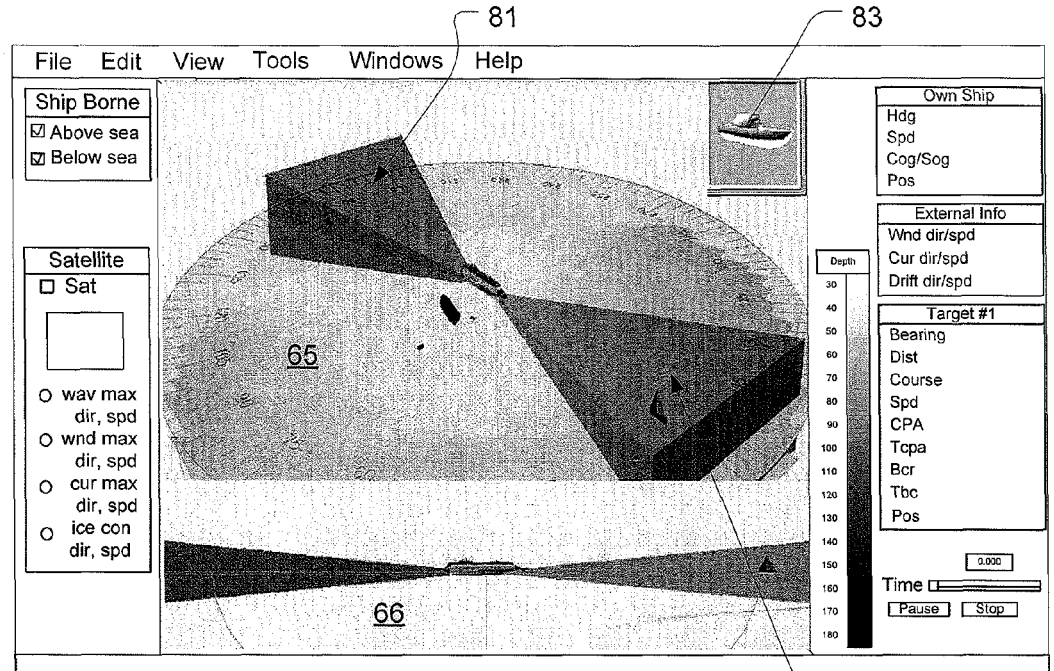

Referring now to FIG. 18, as previously mentioned, the main processing device 20 allows a user to introduce an alarm feature that will flag up any objects within a predetermined zone around the ship. The alarm zone in front of and behind the ship are referenced as 81 and 82 in FIG. 18. The alarm zone shown in FIG. 18 is appropriate when the ship is cruising at high speed and the objects in front of and behind the ship are more important than the objects at the sides. The sailing boat in the bearing direction of the ship is located in the alarm zone and, as a result, a pop-up window 83 showing a graphical representation of the sailing boat has opened in the foreground of the GUI 24. Alternatively, the pop-up window 83 may display a high quality image of the object, if requested by the user as described with respect to FIG. 10.

Figure 19:
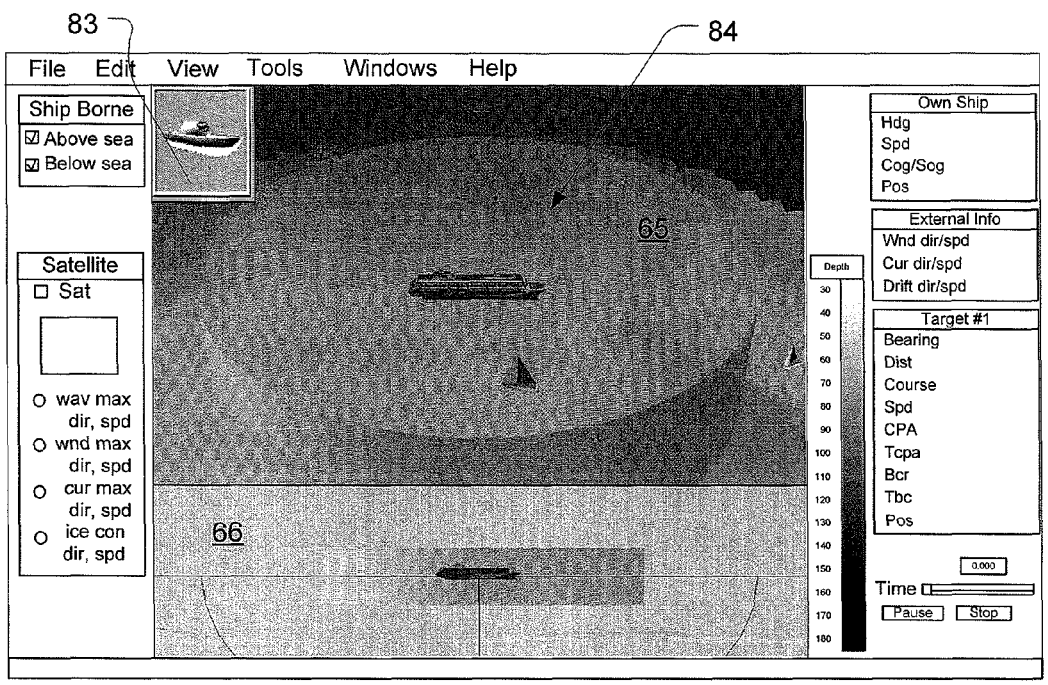

With reference to FIG. 19, a security zone 84 around the ship is shown. If the ship is not moving at high speeds, objects at the sides of the ship may also be a threat to the ship. The security zone 84 forms a cylindrical volume around the ship. All objects in this volume will be flagged to the user of the system and an alarm can also be raised. The pop-up window 83 indicates that a small boat is near the ship 1. In accordance with settings in the system, the alarm may change in dependence on how close to the vessel the object is. Different types of alarms are discussed in more detail with respect to FIG. 20.

The decision on whether the cruising alarm zone or the security zone is displayed in the GUI and the information about objects therein analysed is taken in the integration unit in dependence on the speed and location of the ship. Alternatively, the user of the ship can override the automatic decision by using the menu in the GUI.

The graphical user interface 24, shown in FIG. 12 to 19, is exemplary only and should not be interpreted as limiting. Moreover, slightly different layouts of the user interface and slightly different information is provided in different modes. The system supports five main applications. The first application includes docking, berthing and maneuvering assistance in close range to a harbour as shown in, for example, FIGS. 16 and 17. The second application includes cruising and anti-collision aid as shown in FIG. 18. The third application includes ship safety and security monitoring as shown in FIG. 19. The fourth involves assessment of location of anchorage and monitoring position of anchor and anchor chain/shackles. The fifth application involves assessment of the metocean conditions in the surrounding of the ship, as shown in FIG. 14 or along a sailing plan. The graphical user interface has one default mode for each application and it is configured to change between modes in dependence on the speed of the ship, the number and types of objects detected near the ship and the end users requests. As discussed above, the GUI also provides a rotating function and a zooming function that allow a user to view an object from various observation points and in varying detail.

Alarm and Anti-Intruder Protection

Figure 20:
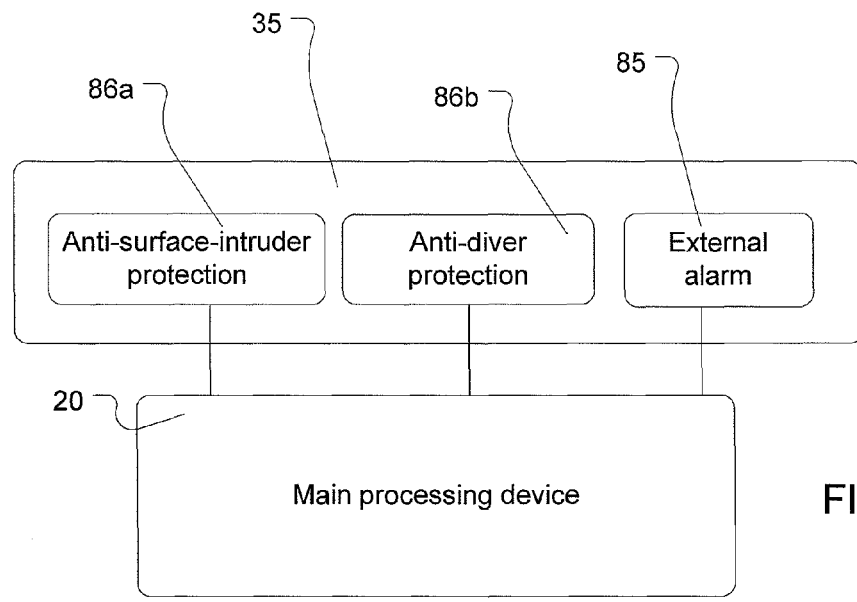
FIG. 20 is a schematic diagram showing how external alarm systems and anti-intruder protection devices can be connected to the main processing device.

With reference to FIG. 20, the anti-intruder protection apparatus 35 of FIG. 3 comprises an external alarm system 85 for making announcements to nearby objects, an anti-surface-intruder protection unit 86a and an anti-diver protection unit 86b for stopping intruders from approaching the ship 1. The external alarm 85, the anti-surface-intruder protection unit 86a and the anti-diver protection unit 86b are connected to the main processing device 20.

If the end-user of the system detects, for example, a diver swimming towards the hull of the ship, the main processing device 20 allows an operator to raise an ear piercing alarm at high decibel under the water, alerting a diver that he is observed. The alarm can be raised using the existing sonar subsystem according to the invention or a separate sonar head. The alarm system can communicate with the diver to, for example, warn him that he needs to surface immediately otherwise lethal, or non-lethal actions will be deployed. Similarly, if the end-user detects an intruder above or on the surface of the water, a long-range acoustic device on the ship may be used to transmit signals of audible frequencies to warn the intruder that he needs to keep distance otherwise lethal, or non-lethal actions will be deployed.

The anti-diver protection unit 86b is configured to output specific acoustic frequencies which when a human under water is subjected thereto induces a range of reactions including one or more of panic, disorientation, physical pain and nausea. A panicking diver generates a lot of movements, which in turn generates more signal return to the sonar. The operator will at this stage be able to confirm that the object is a threat, especially, if the diver approaches the ship further. The operator can then switch on other frequencies that also affect the diver's respiration. Once the diver is surfaced the operator can continue with legal actions.

Similarly, above the surface of the ship an anti-surface-intruder protection device 86a including an acoustic device can be used to output an increasingly loud signal, which may affect the intruder's hearing. The operator will at this stage be able to confirm that the object is a threat, especially, if the surface object approaches the ship further. Additional lethal or non-lethal weapons, including devices affecting the operation of engines or water hoses that blows an object away from the ship, may then also be used.

In order for the user 21a of the system to detect a possible intruder, the system will notify the user once there is a security threat. The user will be notified with an alarm on the speakers 26 and/or a flashing display 25 focusing on the object of concern. The user has to confirm, with the help of the input device 23, the start of the operation of non-lethal/lethal protection devices.

In order for the system to determine weather an object may cause a security threat, the integration unit 22 may correlate object types, geographical location, speed, heading, and location in relation to the end-user's specified security zone.

In the situations where an intruder is detected and lethal or non-lethal protection actions are being authorized by the user, all observational data are automatically communicated in real-time by the system 20 via the control centre 4 to authorized end-users 21b (i.e. coast guard, search and rescue authorities, etc.). Such data communication will have the highest priority of bandwidth allocation and may interrupt other services in the case of limited communication bandwidth availability. The observational data is considered vital for a successful external assistance to the vehicle or installation.

Information System

The catalogue and storage units 15, 19 provide a distributed set of catalogue and storage services where each service maintains one named data set, for example radar or sonar. Consequently, there is one service for each type of sensor. Each data set includes a set of named feature collections, for example "far range" and each feature collection can contain individual features such as the processing level of the data. The catalogue and storage service may utilize Geographic Information Network software (GIN) or any other suitable software to implement the distributed set of catalogue and storage services.

Figure 21:
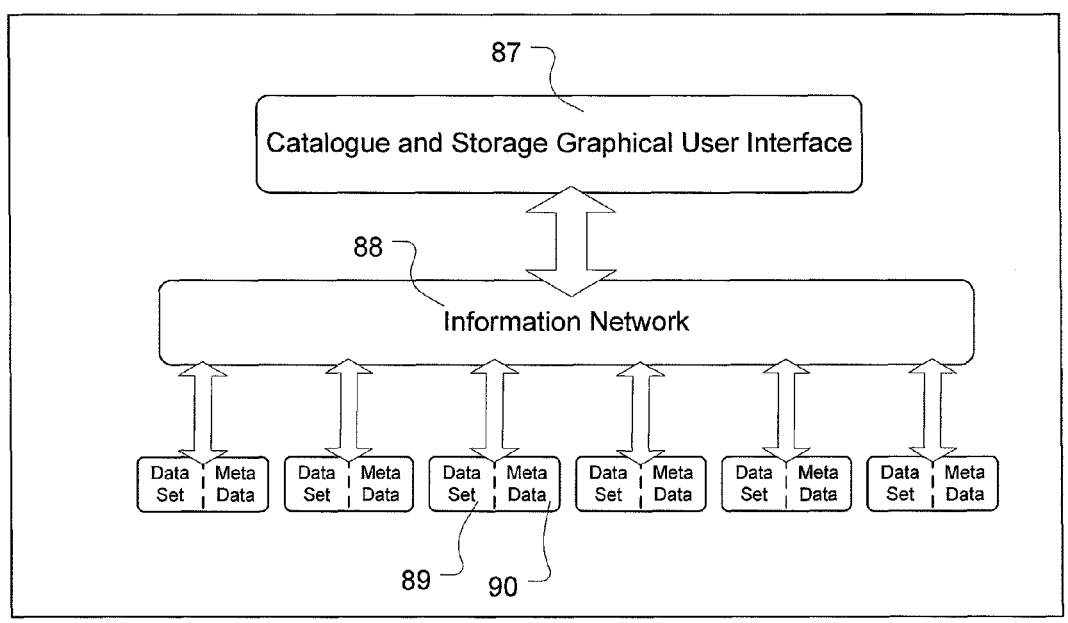
FIG. 21 is a schematic diagram illustrating the structure of a catalogue and storage service.

With reference to FIG. 21, a graphical user interface specific to the catalogue and storage service 87 for storing and retrieving specific sets of data from the catalogue and storage service is provided. The catalogue and storage GUI 87 may be provided as an active X component. It could further have a web GUI to be run in an Internet browser. The catalogue and storage GUI may be connected to a network of distributed catalogue and storage services 88. The GUI 24 described with respect to FIGS. 12 to 19 is connected indirectly to the network 88 via the integration unit 22 such that users 21a of the main processing device 20 do not have to operate the catalogue and storage GUI 87 in order to load or extract information into or from the GUI 24. However, skilled operators may retrieve historical data outside the time slider 77 using the catalogue and storage GUI 87.

All the data sets 89 stored in the catalogue and storage service network 88 have associated meta data 90. The parameters used for searching for particular data in the catalogue and storage GUI 87 are closely linked to the metadata. The meta data includes parameters such as, for example, the date of acquisition, date of processing, the geographical location where the data was collected, the type of the data set, such as radar or sonar, and the owner of the data set.

The data sets may also include meta data indicating whether the data set includes errors. For example, if the user of the system notices that an object in the vicinity of the ship is not classified accurately, he may use the GUI 24 and the user input device 23 to record that an error has occurred. The GUI may also allow the user to enter comments about the type of error that occurred. A skilled operator can then afterwards extract the data for which the error occurred from the catalogue and storage unit 15 using the catalogue and storage GUI 87. The data can be re-processed and analysed and the system can be corrected such that the error is not repeated.

System corrections are released by distributing patches from the control centre 4 via Satcom 5 or the wireless internet to any vessel having said system that causes said errors. Once the patch is downloaded to the main processing device 20 the user of the system will be entitled to upgrade the system at the time of his convenience. The patches will modify the system in order to avoid future errors.

In addition to storing and providing the data in the catalogue and storage unit 19 in the control centre 4 to and from ships, and the data in the catalogue and storage 15 on the ship 1 to and from the control centre, the control centre 4 and the main processing device 20 may also provide the stored data for a number of other applications. Applications in which the data from the control centre 4 and the main processing device 20 can be used include, but is not limited to, near real-time man-over board positions as part of information for search and rescue operations, near-real time EO wind, current, wave data for corrections to wave forecasts, EO wind, current, wave, ice concentration, and/or ice drift statistics for design and certifications, and EO sea and ice state data for environmental metocean applications (i.e. oil spill detection, oil drift assessment, algae bloom observations, etc.). Additionally, the data can be used for pipe-line laying operations, lifting oil production platforms on to their foundation, recovering sunken vessels, drilling for oil, and various operations of survey, dredging and salvage companies. The data will be provided in a customised format for each different application.

Note that the catalogue and storage service 15 pushes data to the control centre's catalogue and storage service 19 once there is unused communication bandwidth available, for example when a ship enters a port with wireless data connection. Such data transfers have lower priority than general data transfers in order not to interrupt external data communication. This procedure releases storage capacity onboard the vessel and allows authorized access to the data for other end-users 21b.

Figure 22:
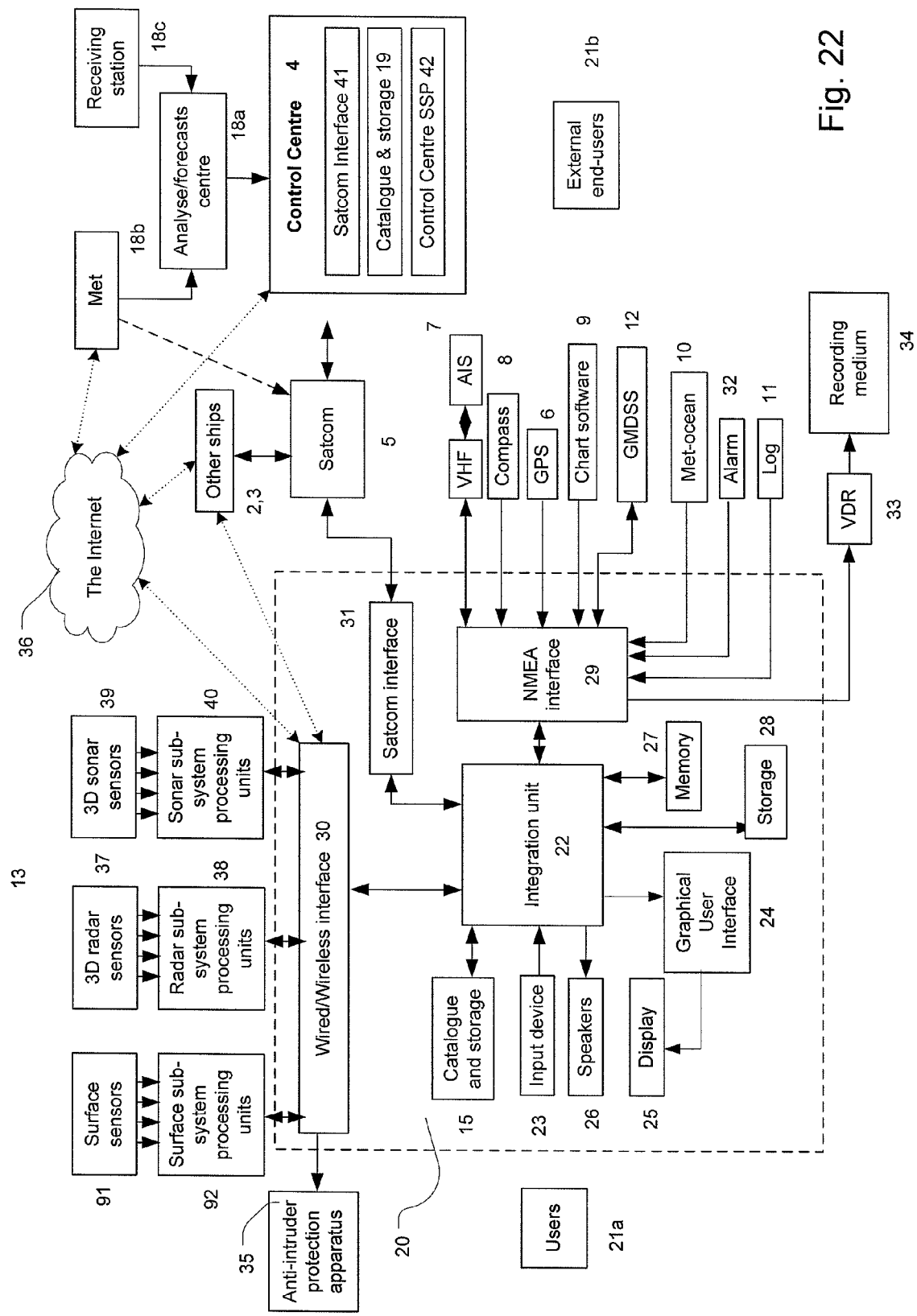
FIG. 22 is a schematic alternative diagram showing how the information sources are connected to the main processing device on the ship.

Referring to FIG. 22, in which like reference numerals refer to like features in FIG. 3, another embodiment of the invention is shown. In the embodiment of FIG. 22, there is, in addition to the onboard sonar and radar subsystem, a surface subsystem for obtaining information about objects at the surface. The subsystem may include a payload combining lidar (light detecting and ranging) sensor or a combination of a lidar and a thermal sensor and/or a laser sensor and/or a hyper/multi-spectral sensor. It should be realised that the system does not have to include each of the surface sensor subsystem, the radar subsystem and the sonar subsystem. Instead, the system may comprise only the radar subsystem, only the sonar subsystem, only the surface subsystem or any combination of two out of the three subsystems in FIG. 22.

It should be understood that although the embodiments have been described with respect to a large ship, the system could also be implemented on a small pleasure boat or any other offshore vehicle or installation or installation in a port or a harbour.

Moreover, the system according to the invention can be installed at the time of building the ship or as a retrofit on an already built ship. Alternatively, it can be installed to upgrade the security, safety, navigation and anti-collision systems already provided on a ship.

The invention claimed is:

1. A system for a marine vessel or a marine installation, the system comprising:
 a first subsystem configured to obtain information about sub-surface objects in a first region around said marine vessel or installation;
 a second subsystem configured to obtain information about above-surface objects in a second region around said marine vessel or installation;
 an Automatic Identification System (AIS) configured to receive identification information from vessels in the vicinity of the marine vessel or marine installation; a receiver configured to receive information from a control centre, the information comprising information from an information source external to said marine vessel or installation, the external information source being located on another marine vessel and the information comprising at least one out of metocean data and information about objects detected in the vicinity of the marine vessel on which the external information source is located;
 a processor arrangement configured to combine and process information from the first subsystem, the second subsystem, the AIS and the receiver, the processor arrangement being configured to perform correlation and assessment of data obtained using at least the first subsystem, the second subsystem and the AIS and being related to the same object; and
a user interface configured to present the combined and processed information to a user of the system.

2. A system according to claim 1, further comprising a third subsystem configured to obtain information about surface layer objects in a third region around said vessel or installation and wherein the processor arrangement is configured to combine and process information received from the first, second and third subsystems, wherein the third subsystem comprises a lidar sensor (light detecting and ranging) and preferably also at least one out of a thermal sensor, a laser, an infrared sensor and a hyper-/multi-spectral sensor.

3. A system according to claim 1, wherein said external information source comprises sensors and instruments located on the other marine vessel.

4. A system according to claim 1, wherein the first and second subsystems are configured to obtain data sets in three dimensions in space and wherein the processor arrangement is configured to generate a scene in three dimensions (3D) in space including information from said regions.

5. A system according to claim 1, wherein the first subsystem comprises at least one sonar sensor, and the second subsystem comprises at least one radar sensor.

6. A system according to claim 1, wherein the information from the information source external to said marine vessel or installation comprises sea state and sea ice state information, the sea state information preferably comprises at least one out of current, wave and wind data and the sea ice state information preferably comprises at least one out of sea ice concentration, sea ice drift data, sea ice edge data and iceberg data.

7. A system according to claim 1, wherein the information obtained in the subsystems comprises at least one out of positional information, shape information, size information and behavioural information about objects in the first and second regions, wherein the behavioural information about an object in said regions includes information about at least one out of speed, heading, change in speed and change in heading of that object.

8. A system comprising an onshore control centre and a marine vessel or installation comprising the system according to claim 1, the onshore control centre comprising a receiver configured to receive information from said vessel or installation via a communication link and a transmitter to transmit said information to third parties.

9. A system according to claim 8, wherein the vessel or installation is a marine vessel and wherein the control centre comprises a processor arrangement configured to perform higher level computation to deliver navigation, safety and security information to said vessel and third parties, the processor arrangement being configured to be operated continuously and to deliver a fuel optimized sail plan, including speed and heading data, to said vessel in real-time or near real-time.

10. A system according to claim 8, wherein the control centre further comprises a processor arrangement for performing correlation and assessment of data obtained using different subsystems or obtained at the control centre and related to the same object or metocean conditions.

11. A system according to claim 1,
wherein the first subsystem and the second subsystems are configured to obtain data sets in three dimensions in space,
and
wherein the first subsystem comprises a sonar sensor, the second subsystem comprises a radar sensors and the system further comprises a third subsystem comprising a lidar sensor or a lidar sensor combined with at least one out of a thermal sensor, a laser sensor, an infrared sensor, and a hyper-/multi-spectral sensor.

12. Data processing apparatus for a marine vessel or marine installation, the data processing apparatus comprising:
an interface configured to receive information from a first subsystem, on a marine vessel or installation, for obtaining information about sub-surface objects in a first region around the marine vessel or marine installation, information from a second subsystem, on the marine vessel or installation, for obtaining information about above-surface objects in a second region around said vessel or installation, information from an AIS system for receiving identification information from vessels in the vicinity of the marine vessel or marine installation, and information from control centre, the information from the control centre comprising information from an information source located on another marine vessel and comprising at least one out of metocean data and information about objects detected in the vicinity of the marine vessel on which the external information source is located;
a processor arrangement configured to process the received information, combine the received and processed information and interpret said combined information; and
a user interface configured to present the interpreted information to a user, wherein the processor arrangement is configured to perform correlation and assessment of data obtained using at least the first subsystem, the second subsystem and the AIS and being related to the same object.

13. Data processing apparatus according to claim 12, wherein said information received from said first and second subsystems comprises information about at least one moving object in the vicinity of the vessel or installation.

14. Data processing apparatus according to claim 13, wherein said processor arrangement is configured to determine whether said moving object is within a predetermined region around the vessel or installation and configured to obtain a real image of said object from said information received from said first and second subsystems.

15. Data processing apparatus according to claim 13, wherein the processor arrangement is further operable to calculate the speed and direction of said moving object and wherein preferably said processor arrangement is further operable to simulate a potential impact between the moving object and said vessel or installation and said user interface is operable to present the results of the simulation to said user.

16. A method comprising:
receiving information from a first subsystem, on a marine vessel or installation, for obtaining information about sub-surface objects in a first region around the marine vessel or installation;
receiving information from a second subsystem, on the marine vessel or installation, for obtaining information about above-surface objects in a second region around said vessel or installation;
receiving identification information from an AIS comprising identification information about one or more marine vessels in the vicinity of the marine vessel or installation;
receiving information from a control centre, the information from the control centre comprising information from an information source external to said marine vessel or installation, the external information source being located on another marine vessel and the information comprising at least one out of metocean data and information about one or more objects detected in the vicinity of the marine vessel on which the external information source is located;

processing the received information;

combining the received and processed information;

interpreting the information; and presenting the information to a user, wherein processing, combining and interpreting the information comprises performing correlation and assessment of data obtained using at least the first subsystem, the second subsystem and the AIS and being related to the same object.

17. A method according to claim 16, wherein said receiving, processing, combining, interpreting and presenting are performed on three-dimensional data sets and wherein the three dimensional data sets comprise data in three dimensions in space and are updated in real-time or near real-time.

18. A method according to claim 16, wherein interpreting the information comprises detecting data indicative of an object in the vicinity of the marine vessel or installation, tracking said object and calculating the speed and heading of said object.

19. A computer program comprising instructions that when executed by a processor arrangement cause the processor arrangement to receive information from a first subsystem, on a marine vessel or marine installation, for obtaining information about sub-surface objects in a first region around said marine vessel or marine installation;

receive information from a second subsystem, on the marine vessel or marine installation, for obtaining information about above-surface objects in a second region around said marine vessel or marine installation;

receive identification information from an AIS comprising identification information about one or more marine vessels in the vicinity of the marine vessel or installation;

receive information from control centre, the information from the control centre comprising information from an information source external to said marine vessel or installation, the external information source being located on another marine vessel and the information comprising at least one out of metocean data and information about one or more objects in the vicinity of the marine vessel on which the external information source is located;

process the received information;

combine the received and processed information;

interpret the information; and present the information to a user, wherein processing, combining and interpreting the information comprises performing correlation and assessment of data obtained using at least the first subsystem, the second subsystem and the AIS and being related to the same object.

* * * * *

UNITED STATES PATENT AND TRADEMARK OFFICE
CERTIFICATE OF CORRECTION

PATENT NO. : 8,180,507 B2  Page 1 of 1
APPLICATION NO. : 12/441061
DATED : May 15, 2012
INVENTOR(S) : Sverre Thune Dokken It is certified that error appears in the above-identified patent and that said Letters Patent is hereby corrected as shown below:

ON THE TITLE PAGE:

Item (57), Abstract in line 7:
Please delete "vessel, en including" and insert --vessel, including--

Signed and Sealed this
Second Day of October, 2012

David J. Kappos
*Director of the United States Patent and Trademark Office*